US012785774B2

(12) United States Patent
Park

(10) Patent No.: US 12,785,774 B2
(45) Date of Patent: Nov. 3, 2026

(54) PERFORMING ENERGY MEASUREMENTS USING CHANNEL STATE INFORMATION (CSI) IN WIRELESS COMMUNICATION

(71) Applicant: KT CORPORATION, Gyeonggi-do (KR)

(72) Inventor: Kyujin Park, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 268 days.

(21) Appl. No.: 18/626,687

(22) Filed: Apr. 4, 2024

(65) Prior Publication Data

US 2024/0340058 A1 Oct. 10, 2024

(30) Foreign Application Priority Data

Apr. 5, 2023 (KR) ........................ 10-2023-0044639
Mar. 19, 2024 (KR) ........................ 10-2024-0037855

(51) Int. Cl.
*H04B 7/06* (2006.01)

(52) U.S. Cl.
CPC ......... *H04B 7/0626* (2013.01); *H04B 7/0658* (2013.01)

(58) Field of Classification Search
CPC .... H04B 7/0626; H04B 7/0658; H04B 7/024; H04B 17/309; H04B 7/0456; H04B 7/06; H04L 25/0202; H04L 25/0226; H04L 5/005; H04L 5/0057; H04L 5/0094
See application file for complete search history.

(56) References Cited

U.S. PATENT DOCUMENTS

2020/0280357 A1* 9/2020 Bae ........................ H04L 5/0098
2022/0322123 A1 10/2022 Kang
2023/0103697 A1 4/2023 Kim et al.
2024/0313920 A1* 9/2024 Li ............................. H04L 5/00
2024/0340051 A1* 10/2024 Kim ...................... H04L 5/0094
(Continued)

FOREIGN PATENT DOCUMENTS

WO 2021/167348 A1 8/2021
WO WO2023014012 A1 * 2/2023
WO WO2024168778 A1 * 8/2024

OTHER PUBLICATIONS

CATT, "Network Energy Saving techniques in spatial and power domain", R1-2300692, 3GPP TSG RAN WG1 #112, Athens, Greece, Feb. 27-Mar. 3, 2023.
(Continued)

*Primary Examiner* — Rushil P. Sampat
(74) *Attorney, Agent, or Firm* — IP Legal Services, LLC

(57) ABSTRACT

Provided are a method and apparatus for efficiently performing CSI report configuration for network energy saving in a wireless communication system and generating a CSI report based on the CSI report configuration. A base station transmits channel state information (CSI) report configuration information to a terminal. The terminal generates a CSI report based on the CSI report configuration information and transmit the CSI report to the base station. The CSI report configuration information includes at least one sub configuration information, and the CSI report includes at least one CSI obtained in units of sub configuration based on the at least one sub configuration information.

12 Claims, 23 Drawing Sheets

(56) References Cited

U.S. PATENT DOCUMENTS

2025/0379625 A1* 12/2025 Zhu ...................... H04B 7/0626

OTHER PUBLICATIONS

Lenovo, "Network energy saving techniques in spatial and power domains", R1-2301206, 3GPP TSG RAN WG1 #112, Athens, Greece, Feb. 27-Mar. 3, 2023.
Vivo, "Discussions on techniques in spatial and power domains", R1-2304492, 3GPP TSG RAN WG1 #113, Incheon, Korea, May 22-May 26, 2023.
European Patent Office, Extended European Search Report of corresponding EP Patent Application No. 24168394.5, Oct. 9, 2024.

* cited by examiner

PERFORMING ENERGY MEASUREMENTS USING CHANNEL STATE INFORMATION (CSI) IN WIRELESS COMMUNICATION

CROSS-REFERENCE TO RELATED THE APPLICATION

This application is based on and claims priority under 35 U.S.C. § 119 to Patent Application No. 10-2023-0044639 filed on Apr. 5, 2023 and No. 10-2024-0037855 filed on Mar. 19, 2024 in the Korean Intellectual Property Office, the disclosures of which are incorporated by reference herein in their entirety.

BACKGROUND

Technical Field

The present specification relates to wireless communication applicable to the fifth-generation technology standard (5G) new radio (NR), 5G-Advanced, and the sixth-generation technology standard (6G).

Description of the Related Art

With the increase in the number of communication devices, there is a consequent rise in communication traffic that needs to be managed. To handle this increased communication traffic, a next generation 5G system, which is an enhanced mobile broadband communication system compared to the exiting LTE system, has become necessary. Such a next generation 5G system has been developed based on scenarios which are classified into Enhanced Mobile BroadBand (eMBB), Ultra-reliability and low-latency communication (URLLC), Massive Machine-Type Communications (mMTC), and the like.

eMBB, URLLC, and mMTC are represent next generation mobile communication scenarios. eMBB is characterized by high spectrum efficiency, high user experienced data rate, high peak data. URLLC is characterized by ultra-reliable, ultra-low latency, ultra-high availability (e.g., vehicle-to-everything (V2X), Emergency Service, Remote Control). mMTC is characterized by low cost, low energy, short packet, and massive connectivity (e.g., Internet of Things (IoT)).

SUMMARY

The present disclosure is to provide a method and apparatus for efficiently performing channel state information (CSI) report configuration for network energy saving (NES) in a wireless communication system and a CSI obtaining procedure for obtaining a CSI report based on the CSI report configuration.

According to an embodiment, an operation method of a terminal in a wireless communication system may be provided. In the method, the terminal (e.g., user equipment) receives channel state information (CSI) report configuration information from a base station, generates a CSI report based on the CSI report configuration information, and transmit the generated CSI report to the base station. The received CSI report configuration information includes at least one sub configuration information, and the transmitted CSI report includes at least one CSI obtained in units of sub configuration based on the at least one sub configuration information.

Further, according to an embodiment of the disclosure, an operation method of a base station in a wireless communication system may be provided. In the operation method, the base station transmits channel state information (CSI) report configuration information to a terminal, and receives a CSI report from the terminal, where the CSI report is generated by the terminal based on the transmitted CSI report configuration information. Here, the transmitted CSI report configuration information includes at least one sub configuration information, and the received CSI report includes at least one CSI obtained in units of sub configuration based on the at least one sub configuration information.

Further, according to an embodiment of the disclosure, a communication device in a wireless communication system may be provided. The communication device may include at least one processor and at least one memory configured to store instructions and operably electrically connected to the at least one processor. The communication device may perform operations based on the instructions being executed by the at least one processor. The operations may include receiving a channel state information (CSI) report configuration information from a base station, generating a CSI report based on the CSI report configuration information, and transmitting the CSI report to the base station. Here, the received CSI report configuration information includes at least one sub configuration information, and the transmitted CSI report includes at least one CSI obtained in units of sub configuration based on the at least one sub configuration information.

Further, an embodiment of the disclosure, a base station in a wireless communication system may be provided. The base station may include at least one processor and at least one memory configured to store instructions, and operably electrically connected to the at least one processor. The base station may perform operations based on the instructions being executed by the at least one processor. The operation may include transmitting channel state information (CSI) report configuration information to a terminal and receiving a CSI report from the terminal, where the CSI report is generated by the terminal based on the CSI report configuration information. Here, the transmitted CSI report configuration information includes at least one sub configuration information, and the received CSI report includes at least one CSI obtained in units of sub configuration based on the at least one sub configuration information.

The at least one CSI may be measured and obtained in units of sub configuration, and a downlink channel measurement process for obtaining the at least one CSI may be allocated in units of sub configuration.

In addition, the maximum number of sub configuration information may be included in the CSI report configuration information and depends on the capability of the terminal (or communication device).

DETAILED DESCRIPTION

Figure 1:
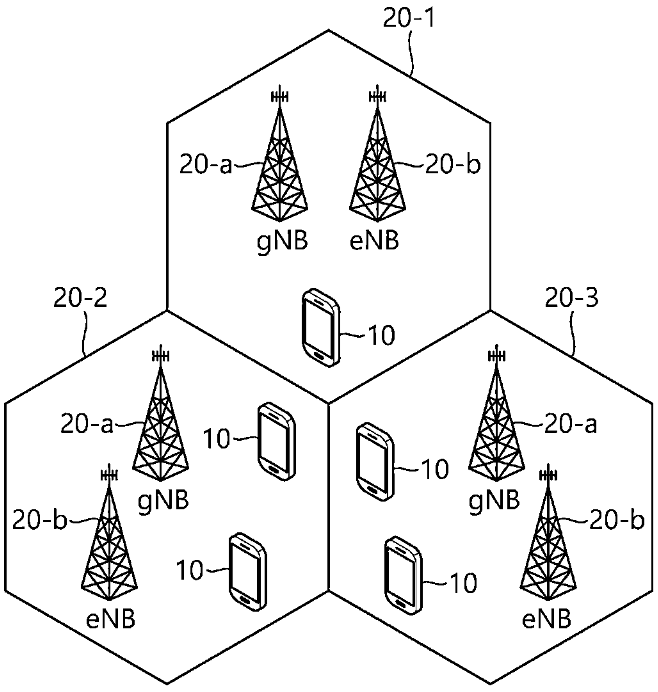
FIG. 1 is a diagram illustrating a wireless communication system.

The technical terms used in this document are for merely describing specific embodiments and should not be considered limiting the embodiments of disclosure. Unless defined otherwise, the technical terms used in this document should be interpreted as commonly understood by those skilled in the art but not too broadly or too narrowly. If any technical terms used here do not precisely convey the intended meaning of the disclosure, they should be replaced with or interpreted as technical terms that accurately understood by those skilled in the art. The general terms used in this document should be interpreted according to their dictionary definitions, without overly narrow interpretations.

The singular form used in the disclosure includes the plural unless the context dictates otherwise. The term 'include' or 'have' may represent the presence of features, numbers, steps, operations, components, parts or the combination thereof described in the disclosure. The term 'include' or 'have' may not exclude the presence or addition of another feature, another number, another step, another operation, another component, another part or the combination thereof.

The terms 'first' and 'second' are used to describe various components without limiting them to these specific terms. The terms 'first' and 'second' are only used to distinguish one component from another component. For example, a first component may be named as a second component without departing from the scope of the disclosure.

When an element or layer is referred to as being "connected to" or "coupled to" another element or layer, it may be directly connected or coupled to the other element or layer, there might be intervening elements or layers. In contrast, when an element or layer is referred to as being "directly connected to" or "directly coupled to" another element or layer, there are no intervening elements or layers.

Hereinafter, the exemplary embodiments of the disclosure will be described in detail with reference to the accompanying drawings. In describing the disclosure, for ease of understanding, the same reference numerals will be used throughout the drawings for the same components, and repetitive description on these components will be omitted. Detailed description on well-known arts that may obscure the essence of the disclosure will be omitted. The accompanying drawings are provided to merely facilitate understanding of the embodiment of disclosure and should not be seen as limiting. It should be recognized that the essence of this disclosure extends the illustrations, encompassing, replacements or equivalents in variations of what is shown in the drawings.

In this disclosure, "A or B" may mean "only A", "only B", or "both A and B". In other words, "A or B" in the disclosure may be interpreted as "A and/or B". For example, "A, B or C" may mean "only A", "only B", "only C", or "any combination of A, B and C".

In this disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In this disclosure, "at least one of A and B" may mean "only A", "only B" or "both A and B". In addition, "at least one of A or B" or "at least one of A and/or B" may be interpreted as the same as "at least one of A and B".

In addition, "at least one of A, B and C" may mean "only A", "only B", "only C", or "any combination of A, B and C". Further, "at least one of A, B or C" or "at least one of A, B and/or C" may mean "at least one of A, B and C".

Also, parentheses used in this disclosure may mean "for example". For example, "control information (PDCCH)" may mean that "PDCCH" is an example of "control information". However, "control information" in this disclosure is not limited to "PDCCH". As another example, "control information (i.e., PDCCH)", may also mean that "PDCCH" is an example of "control information".

Each of the technical features described in one drawing in this disclosure may be implemented independently or simultaneously.

In the accompanying drawings, user equipment (UE) is illustrated as an example and may be referred to as a terminal, mobile equipment (ME), and the like. UE may be a portable device such as a laptop computer, a mobile phone, a personal digital assistance (PDA), a smart phone, a multimedia device, or the like. UE may be a non-portable device such as a personal computer (PC) or a vehicle-mounted device.

Hereinafter, the UE may be as an example of a device capable of wireless communication. The UE may be referred to as a wireless communication device, a wireless device, or a wireless apparatus. The operation performed by the UE may be applicable to any device capable of wireless communication. A device capable of wireless communication may also be referred to as a radio communication device, a wireless device, or a wireless apparatus.

A base station generally refers to a fixed station that communicates with a wireless device. The base station may include an evolved-NodeB (eNodeB), an evolved-NodeB (eNB), a BTS (Base Transceiver System), an access point (Access Point), gNB (Next generation NodeB), RRH (remote radio head), TP (transmission point), RP (reception point), and the repeater (relay).

While embodiments of the disclosure are described based on an long term evolution (LTE) system, an LTE-advanced (LTE-A) system, and an new radio (NR) system, such embodiments may be applicable to any communication system that fits the described criteria.

<Wireless Communication System>

With the success of long-term evolution (LTE)/LTE-A (LTE-Advanced) for the 4th generation mobile communication, the next generation mobile communication (e.g., $5^{th}$ generation: also known as 5G mobile communication) has been commercialized and the follow-up studies are also ongoing.

The 5$^{th}$ generation mobile communications, as defined by the International Telecommunication Union (ITU), provide a data transmission rate of up to 20 Gbps and a minimum actual transmission rate of at least 100 Mbps anywhere. The official name of the 5$^{th}$ generation mobile telecommunications is 'IMT-2020'.

ITU proposes three usage scenarios: enhanced Mobile Broadband (eMBB), massive Machine Type Communication (mMTC) and Ultra Reliable and Low Latency Communications (URLLC).

URLLC is a usage scenario requiring high reliability and low latency. For example, services such as automatic driving, factory automation, augmented reality require high reliability and low latency (e.g., a delay time of less than 1 ms). The delay time of current 4G (e.g., LTE) is statistically about 21 to 43 ms (best 10%) and about 33 to 75 ms (median), which insufficient to support services requiring a delay time of about 1 ms or less. Meanwhile, eMBB is a usage scenario that requires mobile ultra-wideband.

That is, the 5G mobile communication system offers a higher capacity compared to current 4G LTE. The 5G mobile communication system may be designed to increase the density of mobile broadband users and support device to device (D2D), high stability, and machine type communication (MTC). 5G research and development focus on achieving lower latency times and lower battery consumption compared to 4G mobile communication systems, enhancing the implementation of the Internet of things (IoTs). A new radio access technology, known as new RAT or NR, may be introduced for such 5G mobile communication.

An NR frequency band is defined to include two frequency ranges FR1 and FR2. Table 1 below shows an example of the two frequency ranges FR1 and FR2. However, the numerical values associated with each frequency range may be subject to change, and the embodiments are not limited thereto. For convenience of description, FR1 in the NR system may refer to a Sub-6 GHz range, and FR2 may refer to an above-6 GHz range, which may be called millimeter waves (mmWs).

TABLE 1

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The numerical values of the frequency ranges may be subject to change in the NR system. For example, FR1 may range from about 410 MHz to 7125 MHz as listed in [Table 1]. That is, FR1 may include a frequency band of 6 GHz (or 5850, 5900, and 5925 MHz) or higher. For example, the frequency band of 6 GHz (or 5850, 5900, and 5925 MHz) or higher may include an unlicensed band. The unlicensed band may be used for various purposes, for example, vehicle communication (e.g., autonomous driving).

The 3GPP communication standards define downlink (DL) physical channels and DL physical signals. DL physical channels are related to resource elements (REs) that convey information from a higher layer while DL physical signals, used in the physical layer, correspond to REs that do not carry information from a higher layer. For example, DL physical channels include physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH). DL physical signals include reference signals (RSs) and synchronization signals (SSs). A reference signal (RS) is also known as a pilot signal and has a predefined special waveform known to both a gNode B (gNB) and a UE. For example, DL RSs include cell specific RS, UE-specific RS (UE-RS), positioning RS (PRS), and channel state information RS (CSI-RS). The 3GPP LTE/LTE-A standards also define uplink (UL) physical channels and UL physical signals. UL channels correspond to REs with information from a higher layer. UL physical signals are used in the physical layer and correspond to REs which do not carry information from a higher layer. For example, UL physical channels include physical uplink shared channel (PUSCH), physical uplink control channel (PUCCH), and physical random access channel (PRACH). UL physical signals include a demodulation reference signal (DMRS) for a UL control/data signal, and a sounding reference signal (SRS) used for UL channel measurement.

In this disclosure, PDCCH/PCFICH/PHICH/PDSCH refers to a set of time-frequency resources or a set of REs carrying downlink control information (DCI)/a control format indicator (CFI)/a DL acknowledgement/negative acknowledgement (ACK/NACK)/DL data. Further, PUCCH/PUSCH/PRACH refers to a set of time-frequency resources or a set of REs carrying UL control information (UCI)/UL data/a random access signal.

FIG. 1 is a diagram illustrating a wireless communication system.

Referring to FIG. 1, the wireless communication system may include at least one base station (BS). For example, the BSs may include a gNodeB (or gNB) 20*a* and an eNodeB (or eNB) 20*b*. The gNB 20*a* supports 5G mobile communication. The eNB 20*b* supports 4G mobile communication, that is, long term evolution (LTE).

Each BS 20*a* and 20*b* provides a communication service for a specific geographic area (commonly referred to as a cell) (20-1, 20-2, 20-3). The cell may also be divided into a plurality of areas (referred to as sectors).

A user equipment (UE) typically belongs to one cell, and the cell to which the UE belongs is called a serving cell. A base station providing a communication service to a serving cell is referred to as a serving base station (serving BS). Since the wireless communication system is a cellular system, there are other cells adjacent to the serving cell. The other cell adjacent to the serving cell is referred to as a neighbor cell. A base station that provides a communication service to a neighboring cell is referred to as a neighbor BS. The serving cell and the neighboring cell are relatively determined based on the UE.

Hereinafter, downlink means communication from the base station 20 to the UE 10, and uplink means communication from the UE 10 to the base station 20. In the downlink, a transmitter may be a part of the base station 20, and a receiver may be a part of the UE 10. In the uplink, the transmitter may be a part of the UE 10, and the receiver may be a part of the base station 20.

In a wireless communication system, there are primarily two schemes: frequency division duplex (FDD) scheme and time division duplex (TDD) scheme. In the FDD scheme, uplink transmission and downlink transmission occur on different frequency bands. Conversely, the TDD scheme allows both uplink transmission and downlink transmission to use the same frequency band, but at different times. A key characteristic of the TDD scheme is the substantial reciprocity of the channel response, meaning that the downlink channel response and the uplink channel response are almost identical within a given frequency domain. This reciprocity in TDD-based radio communication systems enables the estimation of the downlink channel response from the uplink channel response. In the TDD scheme, since uplink transmission and downlink transmission are time-divided in the entire frequency band, it is not possible to simultaneously perform downlink transmission by the base station and uplink transmission by the UE. In a TDD system where uplink transmission and downlink transmission are divided into subframe units, uplink transmission and downlink transmission are performed in different subframes.

Figure 2:
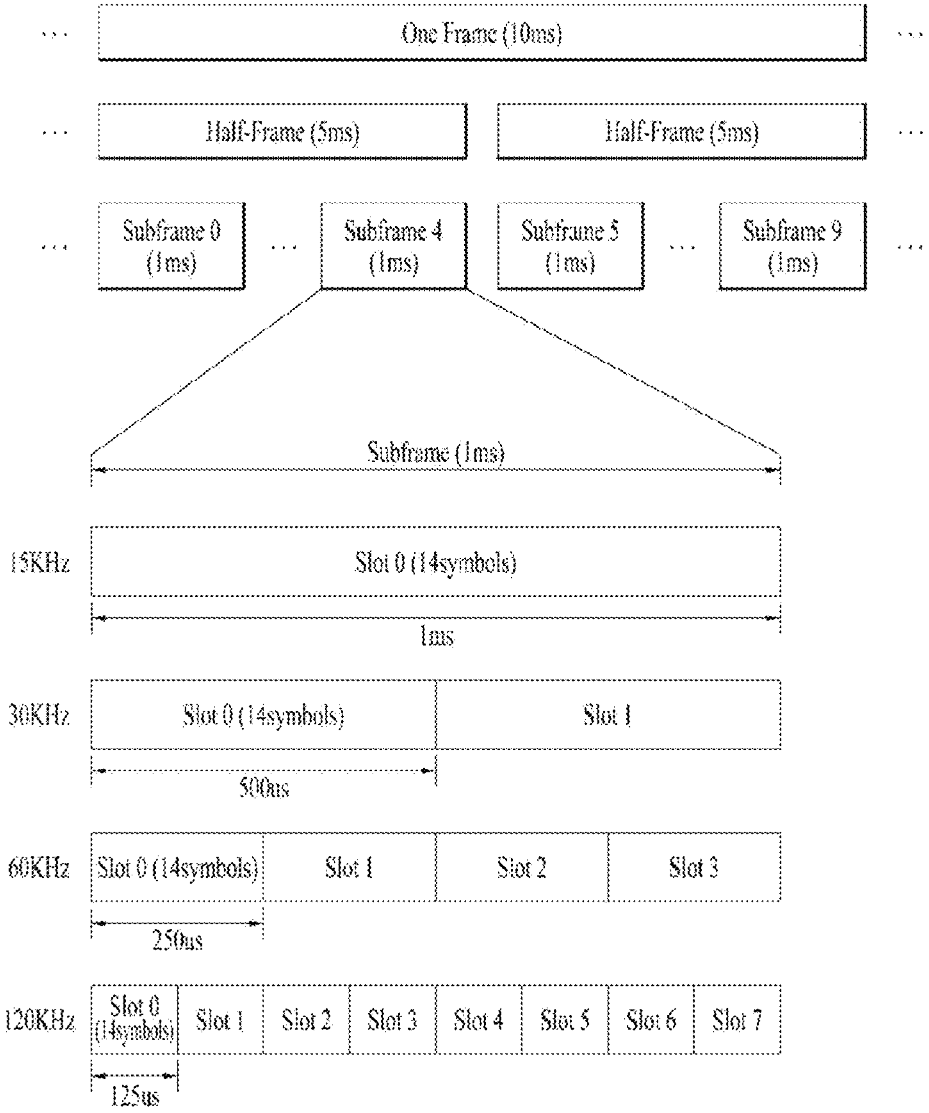
FIG. 2 is a diagram illustrating a structure of a radio frame used in new radio (NR).

FIG. 2 is a diagram illustrating a structure of a radio frame used in NR.

In NR, UL and DL transmissions are configured in frames. Each radio frame has a length of 10 ms and is divided into two 5-ms half frames (HFs). Each half frame is divided into five 1-ms subframes. A subframe is divided into one or more slots, and the number of slots in a subframe depends on the subcarrier spacing (SCS). Each slot includes 12 or 14 OFDM (A) symbols according to a Cyclic Prefix (CP). With a normal CP, a slot includes 14 OFDM symbols. With an extended CP, a slot includes 12 OFDM symbols. A symbol may include an OFDM symbol (CP-OFDM symbol) and an SC-FDMA symbol (or DFT-s-OFDM symbol).

<Support of Various Numerologies>

As wireless communication technology advances, the NR system may offer various numerologies to terminals. For example, when a subcarrier spacing (SCS) is set at 15 kHz, it supports a broad range of the typical cellular bands. When a subcarrier spacing (SCS) is set at 30 kHz/60 kHz, it supports a dense-urban, lower latency, wider carrier bandwidth. When the SCS is 60 kHz or higher, it supports a bandwidth greater than 24.25 GHz in order to overcome phase noise.

These numerologies may be defined by the cyclic prefix (CP) length and the SCS. A single cell in the NR system is capable of providing multiple numerologies to terminals. Table 2 below shows the relationship between the subcarrier spacing, corresponding CP length, and the index of a numerology (represented by μ).

TABLE 2

| μ | $\Delta f = 2^{\mu} \cdot 15$ [kHz] | CP |
|---|---|---|
| 0 | 15 | normal |
| 1 | 30 | normal |
| 2 | 60 | normal, extended |
| 3 | 120 | normal |
| 4 | 240 | normal |
| 5 | 480 | normal |
| 6 | 960 | normal |

Table 3 below shows the number of OFDM symbols per slot ($N^{slot}_{symb}$), the number of slots per frame ($N^{frame,\mu}_{slot}$), and the number of slots per subframe ($N^{subframe,\mu}_{slot}$) according to each numerology expressed by μ in the case of a normal CP.

TABLE 3

| μ | $\Delta f = 2^{\mu} \cdot 15$ [kHz] | $N^{slot}_{symb}$ | $N^{frame,\mu}_{slot}$ | $N^{subframe,\mu}_{slot}$ |
|---|---|---|---|---|
| 0 | 15 | 14 | 10 | 1 |
| 1 | 30 | 14 | 20 | 2 |
| 2 | 60 | 14 | 40 | 4 |
| 3 | 120 | 14 | 80 | 8 |
| 4 | 240 | 14 | 160 | 16 |
| 5 | 480 | 14 | 320 | 32 |
| 6 | 960 | 14 | 640 | 64 |

Table 4 below shows the number of OFDM symbols per slot ($N^{slot}_{symb}$), the number of slots per frame ($N^{frame,\mu}_{slot}$), and the number of slots per subframe ($N^{subframe,\mu}_{slot}$) of a numerology represented by μ in the case of an extended CP.

TABLE 4

| μ | SCS ($15*2^{u}$) | $N^{slot}_{symb}$ | $N^{frame,\mu}_{slot}$ | $N^{subframe,\mu}_{slot}$ |
|---|---|---|---|---|
| 2 | 60 KHz (u = 2) | 12 | 40 | 4 |

In the NR system, OFDM(A) numerologies (e.g., SCS, CP length, and so on) may be configured differently across multiple cells that are integrated with a single terminal. Accordingly, the duration of time resource may vary among these integrated cells. Here, the duration may be referred to as a section. The time resource may include a subframe, a slot or a transmission time interval (TTI). Further, the time resource may be collectively referred to as a time unit (TU) for simplicity and include the same number of symbols.

Figure 3A:
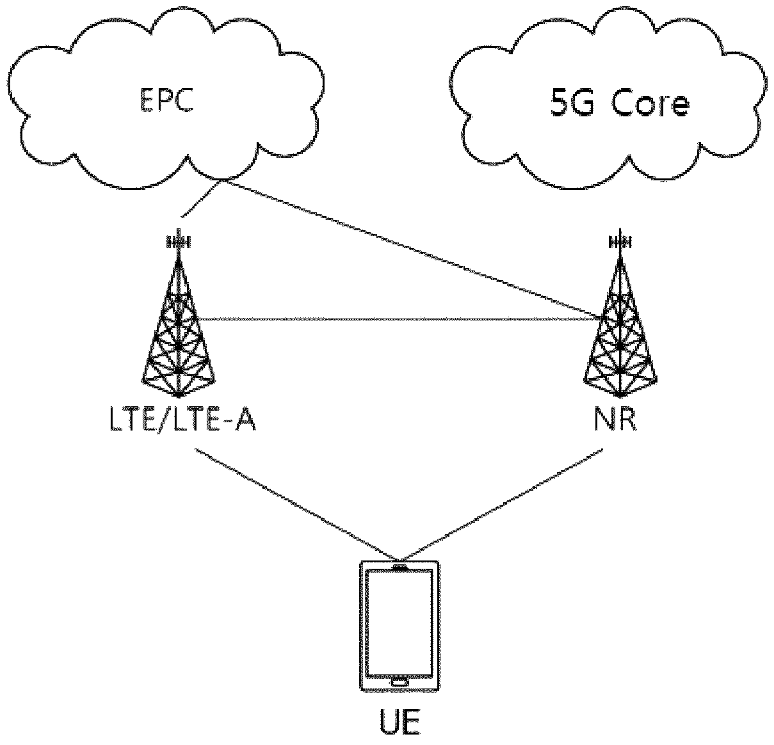
FIGS. 3A to 3C illustrate exemplary architectures for a wireless communication service.
Figure 3B:
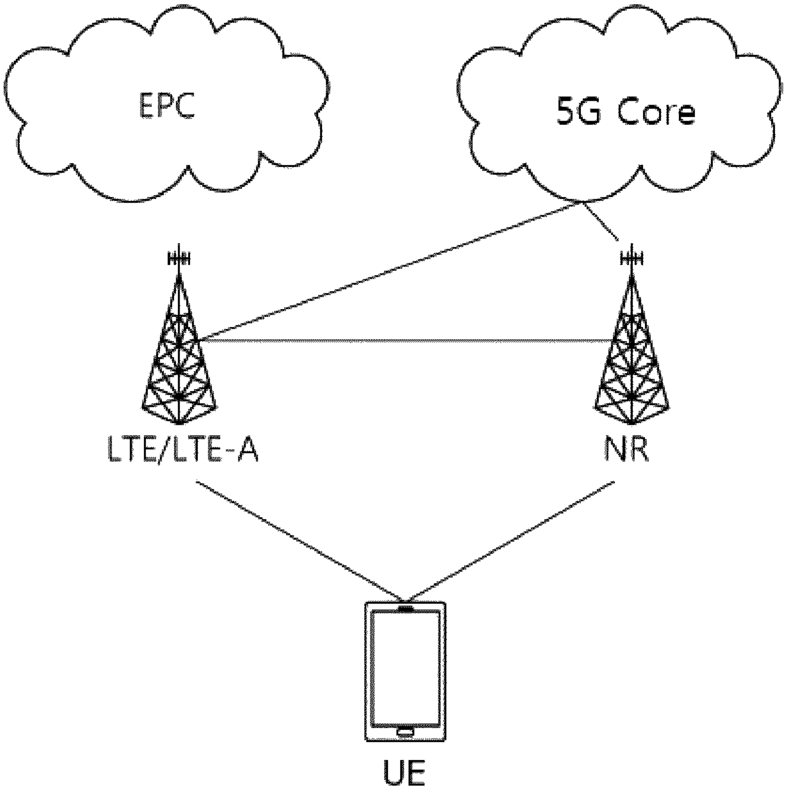
Figure 3C:
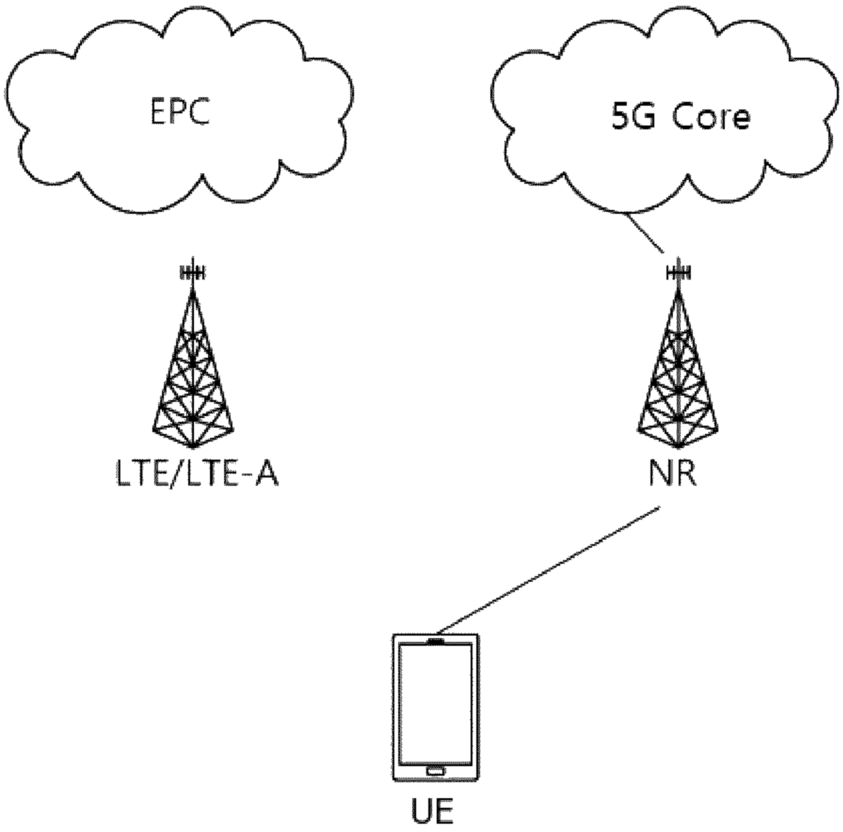

FIGS. 3A to 3C illustrate exemplary architectures for a wireless communication service.

Referring to FIG. 3A, a UE is connected in dual connectivity (DC) with an LTE/LTE-A cell and a NR cell.

The NR cell is connected with a core network for the legacy fourth-generation mobile communication, that is, Evolved Packet core (EPC).

Referring to FIG. 3B, the LTE/LTE-A cell is connected with a core network for 5th generation mobile communication, that is, a 5G core network.

A service provided by the architecture shown in FIGS. 3A and 3B is referred to as a non-standalone (NSA) service.

Referring to FIG. 3C, a UE is connected only with an NR cell. A service provided by this architecture is referred to as a standalone (SA) service.

In the new radio access technology (NR), the use of a downlink subframe for reception from a base station and an uplink subframe for transmission to the base station may be employed. This method may be applicable to both paired spectrums and unpaired spectrums. Paired spectrums involve two subcarriers designated for downlink and uplink operations. For example, one subcarrier within a pair of spectrums may include a pair of a downlink band and an uplink band.

Figure 4:
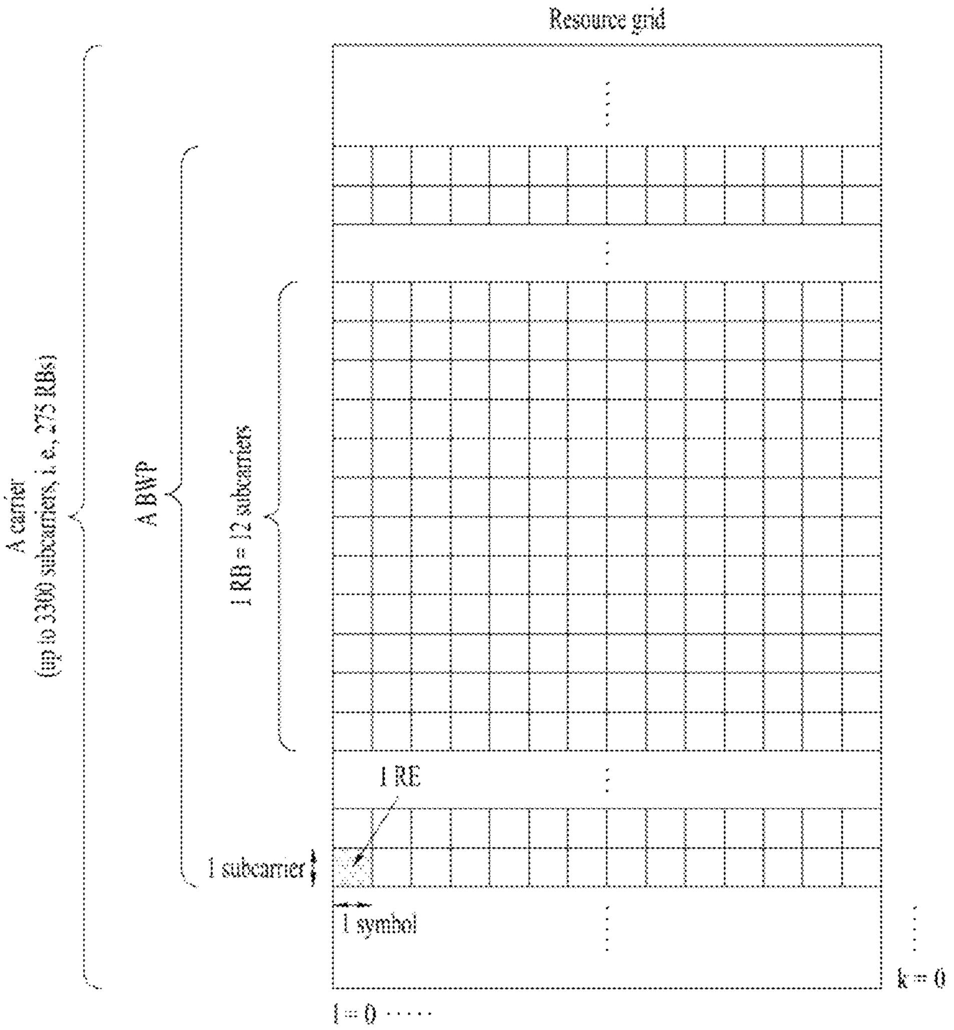
FIG. 4 illustrates a slot structure of an NR frame.

FIG. 4 illustrates a slot structure of an NR frame.

A slot in the NR system includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a set of consecutive subcarriers (e.g., 12 consecutive subcarriers) in the frequency domain. A bandwidth part (BWP) is defined as a sequence of consecutive physical resource blocks (PRBs) in the frequency domain and may be associated with a specific numerology (e.g., SCS, CP length, etc.). A terminal may be configured with up to N (e.g., five) BWPs in each of downlink and uplink. Downlink or uplink transmission is performed through an activated BWP. Among the BWPs configured for the terminal, only one BWP may be activated at a given time. In the resource grid, each element is referred to as a resource element (RE), and one complex symbol may be mapped thereto.

Figure 5:
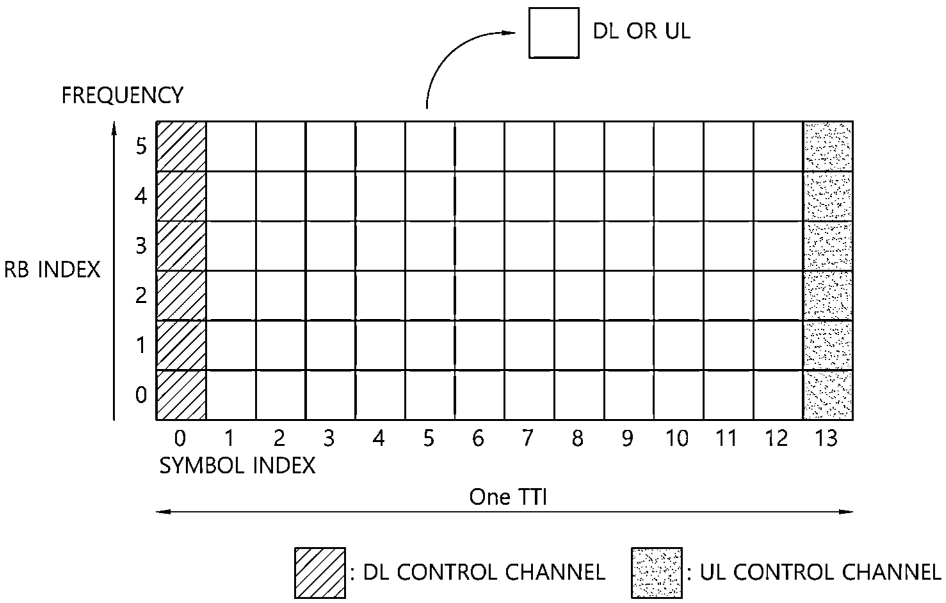
FIG. 5 shows an example of a subframe type in NR.

FIG. 5 shows an example of a subframe type in NR.

In NR (or new RAT), a Transmission Time Interval (TTI), as shown in FIG. 5, may be referred to as a subframe or slot. The subframe (or slot) may be utilized in a TDD system to minimize data transmission delay. As shown in FIG. 5, a subframe (or slot) includes 14 symbols. The symbol at the head of the subframe (or slot) may be allocated for a DL control channel, and the symbol at the end of the subframe (or slot) may be assigned for a UL control channel. The remaining symbols may be used for either DL data transmission or UL data transmission. This subframe (or slot) structure allows sequential downlink and uplink transmissions in one single subframe (or slot). Accordingly, downlink data may be received in a subframe (or slot) and uplink ACK/NACK may be transmitted in the same subframe (or slot).

Such a subframe (or slot) structure may be referred to as a self-contained subframe (or slot).

The first N symbols in a slot may be used to transmit a DL control channel and referred to as a DL control region, hereinafter. The last M symbols in the slot may be used to transmit a UL control channel and referred to as a UL control region. N and M are integers greater than 0. A resource region between the DL control region and the UL control region may be used for either DL data transmission or UL data transmission and referred to as a data region. For example, a physical downlink control channel (PDCCH) may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region.

Using this subframe (or slot) structure reduces the time required for retransmitting data that has failed in reception, thereby minimizing overall data transmission latency. In such a self-contained subframe (or slot) structure, a time gap may be required for transitioning between a transmission mode and a reception mode or from the reception mode to the transmission mode. To accommodate this, a few OFDM symbols when switch from DL to UL in the subframe structure may be configured to a guard period (GP).

Figure 6:
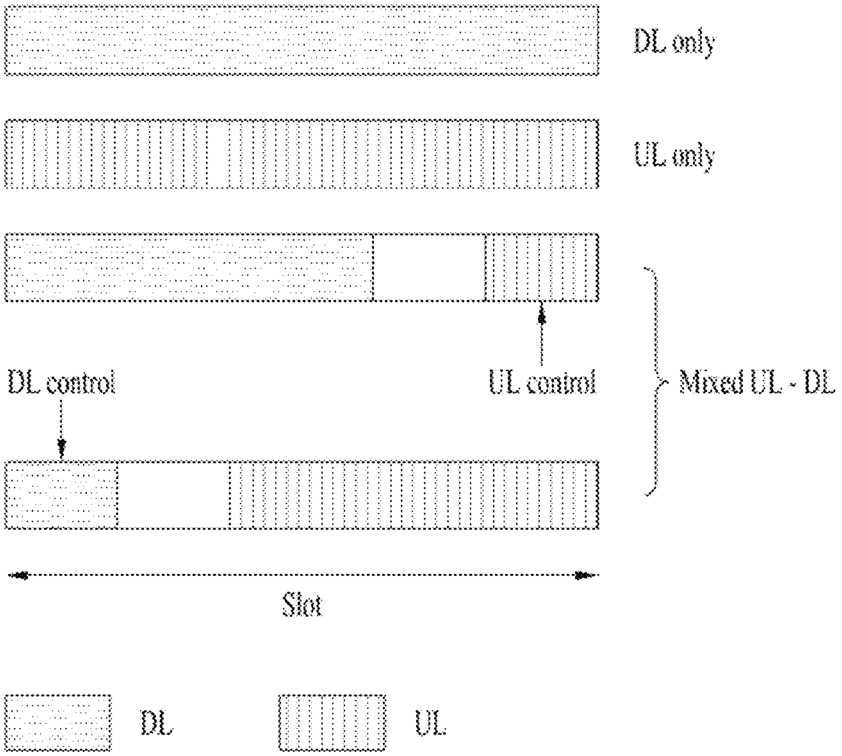
FIG. 6 illustrates a structure of a self-contained slot.

FIG. 6 illustrates a structure of a self-contained slot.

In the NR system, the frames are structured as a self-contained structure, where one single slot includes a DL control channel, either a DL or UL data channel, and UL control channel. For example, the first N symbols in a slot may be used for transmitting a DL control channel and referred to as a DL control region. The last M symbols in the slot may be used for transmitting an UL control channel and referred to as a UL control region. N and M are integers greater than 0. A resource region between the DL control region and the UL control region may be used for either DL data transmission or UL data transmission and referred to as a data region.

For example, the following configurations may be taken into account. The durations are listed in temporal order.

1. DL only configuration
2. UL only configuration
3. Mixed UL-DL configuration

DL region+Guard Period (GP)+UL control region

DL control region+GP+UL region

DL region: (i) DL data region, (ii) DL control region+DL data region

UL region: (i) UL data region, (ii) UL data region+UL control region

A PDCCH may be transmitted in the DL control region, and a PDSCH may be transmitted in the DL data region. A PUCCH may be transmitted in the UL control region, and a PUSCH may be transmitted in the UL data region. Through the PDCCH, Downlink Control Information (DCI), for example, DL data scheduling information or UL data scheduling data may be transmitted. Through the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A guard period (GP) provides a time gap for a gNB and a terminal to switch between the transmission and reception modes. Part of symbols within a subframe that correspond to the transition from DL to UL may be configured as the GP.

<CSI-RS>

CSI-RS is a channel state information reference signal. The CSI-RS is a reference signal used for the UE to report CSI feedback to an associated serving cell.

The CSI-RS may be composed of one or more CSI-RS configurations, including a zero-power CSI-RS and a non-zero-power CSI-RS.

For the non-zero-power CSI-RS, the sequence is generated according to clause 7.4.1.5.2 of 3GPP TS 38.211 and mapped onto resource elements according to clause 7.4.1.5.3.

In the case of the zero-power CSI-RS, the UE assumes that the resource elements defined in clause 7.4.1.5.3 of 3GPP TS 38.211 are not used for PDSCH transmission and therefore does not estimate downlink transmission on the resource elements.

CSI-RS Locations in a Slot

1) Frequency location: The starting subcarrier of a component RE pattern is as follows.

For 1 port CSI-RS, no limitation.

For Y=2, limited to one of even number of subcarriers.

For Y=4, limited to one of subcarrier 0, 4, and 8.

where, Y is the gap of the starting subcarrier.

2) Time location: transmitted from 5, 6, 7, 8, 9, 10, 12, and 13 OFDM symbols.

Cycle

The following CSI-RS transmission cycle is supported in NR.

{5, 10, 20, 40, 80, 160, 320, 640} slots

<Synchronization Signal Block (SSB) in NR>

In 5G NR, a synchronization signal/physical broadcast channel block (SS/PBCH Block: SSB) includes information for a UE's an initial access. For example, the information includes a physical broadcast channel (PBCH) with a master information block (MIB) and a synchronization signal (SS) encompassing primary synchronization signal (PSS) and a secondary synchronization signal (SSS).

In addition, a plurality of SSB may be grouped to form an SS burst, and multiple SS bursts may be grouped to create an SS burst set. Each SSB is typically beamformed in a specific direction, allowing various SS blocks within the SS burst set to accommodate UEs located in different directions.

Figure 7A:
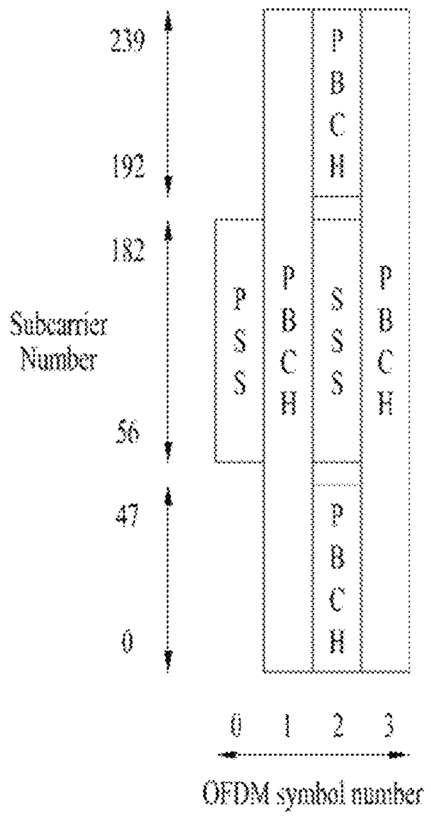
FIGS. 7A to 7C illustrate the structure of a synchronization signal block (SSB) in NR.
Figure 7B:
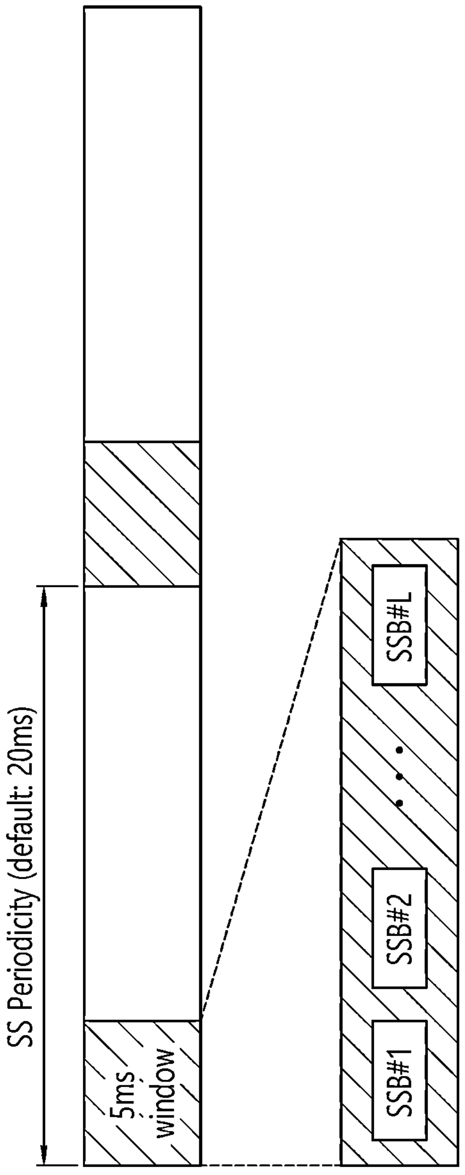
Figure 7C:
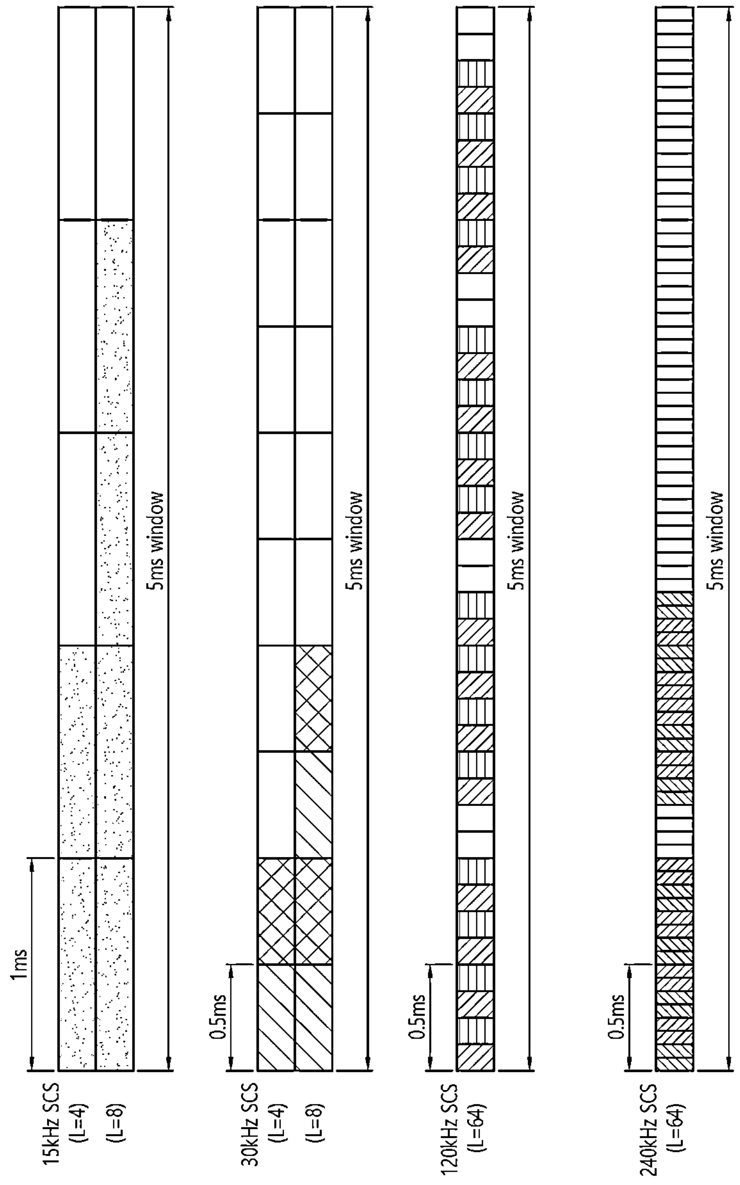

FIGS. 7A to 7C illustrate the structure of a synchronization signal block (SSB) in NR.

A UE may utilize an SSB for various tasks such as cell search, system information acquisition, beam alignment for initial access, and DL measurement. The term SSB may be used interchangeably with synchronization signal/physical broadcast channel (SS/PBCH).

Referring to FIG. 7A, the SSB includes a primary synchronization signal (PSS), a secondary synchronization signal (SSS), and a physical broadcast channel (PBCH). The SSB is configured in four consecutive orthogonal frequency division multiplexing (OFDM) symbols, and the PSS, the PBCH, the SSS/PBCH and the PBCH are transmitted in the respective OFDM symbols. Each of the PSS and the SSS includes one OFDM symbol and 127 subcarriers, and the PBCH includes three OFDM symbols and 576 subcarriers. The PBCH employs polar coding and quadrature phase shift keying (QPSK). The PBCH includes both data REs and demodulation reference signal (DMRS) REs in each OFDM symbol. There are three DMRS REs per RB, with three data REs interspersed between every two adjacent DMRS REs.

Referring to FIGS. 7B and 7C, an SSB in an SS burst may be transmitted within a 5 ms window regardless of the cycle of the SS burst set. The candidate number of SSBs that can fit in the 5 ms window may be L.

For various frequency bands, the maximum number L of SSBs in the SS burst set may vary as per the following examples (it is assumed that the minimum number of SSBs in each SS burst set is 1, to define performance requirement).

frequency band less than 3 GHz: L=4 frequency band of 3 GHz to 6 GHZ: L=8 frequency band of 6 GHz to 52.6 GHz: L=64

As shown in FIG. 7B, an SSB cycle may be 20 ms. Specifically, a default value for initial cell selection may be 20 ms. In addition, the SSB cycle in RRC CONNECTED/RRC IDLE and NSA may for example be one of {5, 10, 20, 40, 80, 160} ms.

FIG. 7C shows the SSB configuration within a 5 ms window. FIG. 7C shows the examples of SSB according to L in subcarrier spacing (SCS) and each SCS. Referring to FIG. 7C, two SSBs may be placed in each patterned area. For example, when L=4 in 15 kHz SCS, two SSBs are positioned in each of two patterned areas. Accordingly, a total of 4 SSBs may be transmitted within the 5 ms window. As another example, when L=64 in 240 KHz SCS, SSBs are respectively placed in 32 patterned areas. Accordingly, a total of 64 SSBs may be transmitted within the 5 ms window.

In the time domain of the time-frequency structure of an SS/PBCH block, the SSB may be composed of 4 OFDM symbols, and the 4 OFDM symbols may be numbered from 0 to 3 in ascending order in the SSB. In the SSB, PSS, SSS and PBCH (related to DM-RS) may use OFDM symbols.

In the frequency domain, the SSB may include 240 consecutive subcarriers. Here, the subcarriers may be numbered from 0 to 239 in the SSB. Here, K represents a frequency index, l is a time index, and k and l may be defined within one SSB.

The UE may consider SSBs transmitted with the same block index as quasi co-located (QCL) in terms of r Doppler spread, Doppler shift, average gain, average delay, and spatial Rx parameters. However, the UE may not regard SSBs transmitted with different block indices as being QCL.

Figure 8:
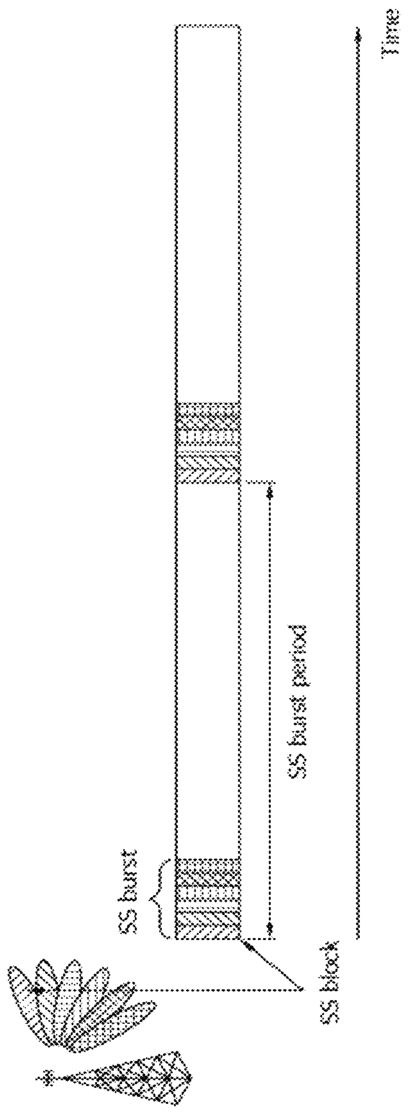
FIG. 8 illustrates SSB transmission in NR.

FIG. 8 illustrates SSB transmission in NR.

Referring to FIG. 8, an SS burst is transmitted in at regular intervals. Accordingly, a UE receives SSBs and conduct cell detection and measurement.

Meanwhile, in 5G NR, beam sweeping is performed on the SSB. Such beam sweeping will be described with reference to FIG. 9.

Figure 9:
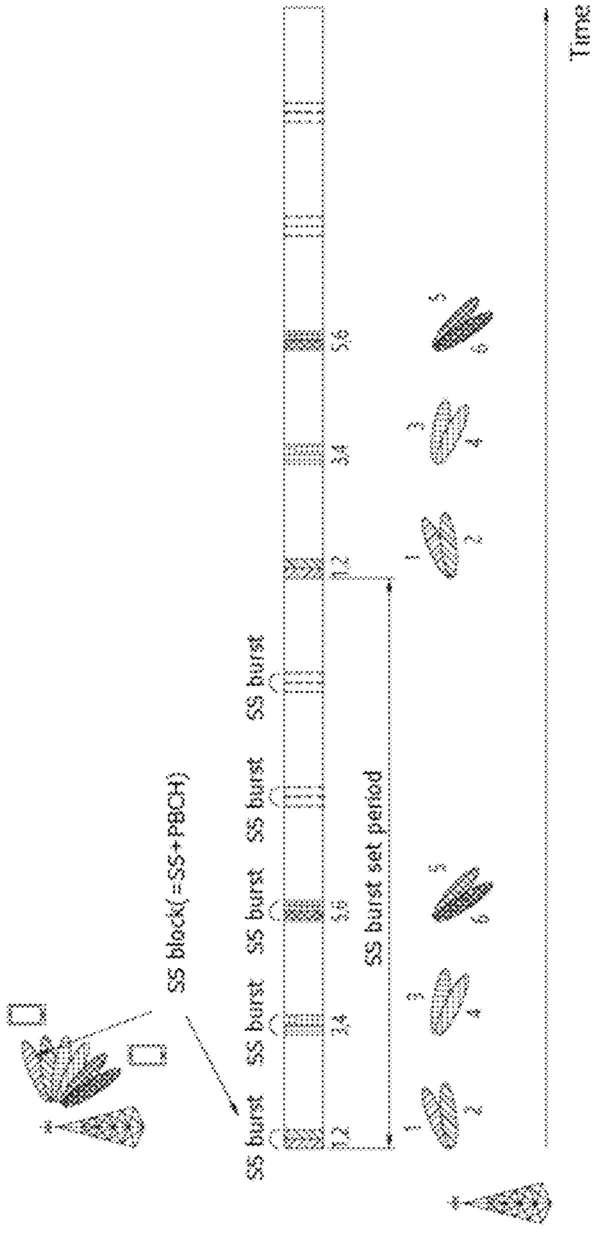
FIG. 9 illustrates beam sweeping in NR.

FIG. 9 illustrates beam sweeping in NR.

A base station transmits each SSB within an SS burst over time while performing beam sweeping. In this case, multiple SSBs in an SS burst set are transmitted to support UEs present in different directions. As shown in FIG. 9, the SS burst set includes one to six SSBs, and each SS burst includes two SSBs.

Figure 10:
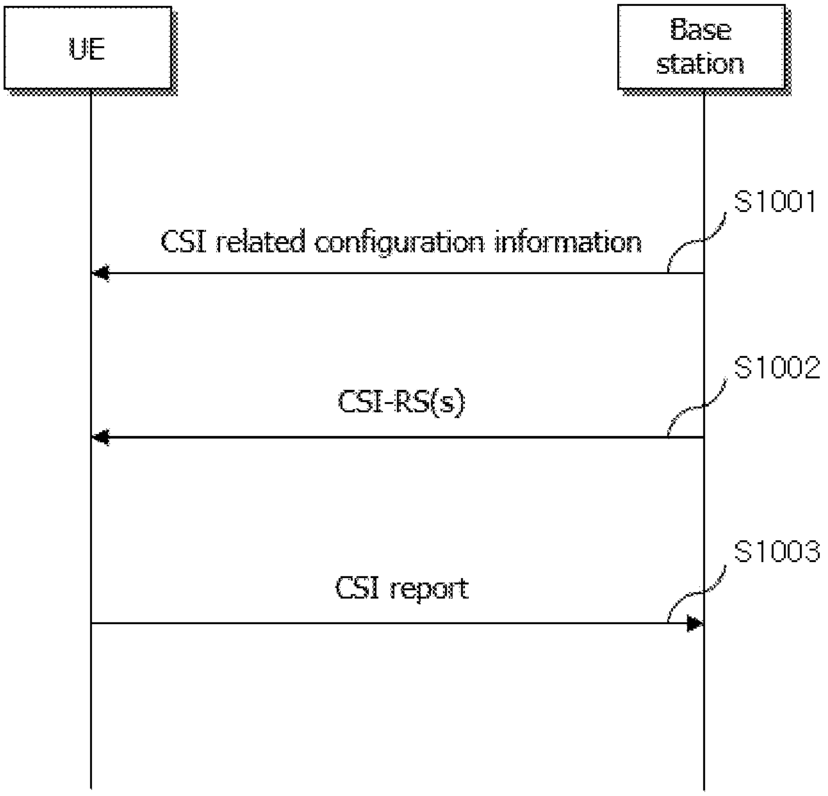
FIG. 10 is a signal flowchart that illustrates a method of processing channel state information (CSI).

FIG. 10 illustrates channel state information (CSI) related procedure.

In 5G NR, the CSI-RS is used for performing operations, such as time/frequency tracking, CSI calculation, layer 1 (L1)-reference signal received power (RSRP) and L1-signal to interference and noise ratio (SINR) computation, and mobility. Here, the CSI calculation may be related to CSI acquisition, and L1-RSRP and L1-SINR computation may be related to beam management (BM).

Referring to FIG. 10, to perform at least one of the foregoing operations using the CSI-RS, the UE receives the CSI-related configuration information from the base station through radio resource control (RRC) signaling (S1001).

The CSI-related configuration information may include at least one of CSI-interference management (IM) resource-related information, CSI measurement configuration-related information, CSI resource configuration-related information, CSI-RS resource-related information, and CSI report configuration-related information.

When receiving at least one CSI-RS (i.e., one CSI-RS or multiple CSI-RSs) from the base station (S1002), the UE performs the CSI calculation based on the CSI-related configuration information to acquire the CSI, and then performs CSI feedback, i.e., transmits a CSI report to the base station (S1003).

The present disclosure is to provide a channel measurement method of a terminal (e.g., user equipment: UE) for network energy saving in a wireless communication system. In particular, the disclosure is to provide a CSI report configuring method for a base station that supports a plurality of transceiving antenna input/output terminals. The CSI report configuring method may include performing channel measurement based on some antenna ports of any channel measurement resource (CMR) and performing CSI reporting. Further, the present disclosure is to provide a CSI reporting method of the terminal based on the CSI report configuring method.

Mobile carriers globally are currently deploying 5G wireless networks that predominantly utilize a massive multiple-input and multiple-output (MIMO) system. This system supports multiple transceiving antenna elements and multiple corresponding antenna ports, facilitating a significantly enhanced data transmission rate compared to LTE networks. Additionally, it enables improved coverage performance in a high frequency band. However, such an increase in the number of antennas at the base station results in a corresponding rise in the number of transceiver chains and power amplifiers, leasing to higher power consumption at the base station. Accordingly, many mobile carriers have shown considerable interest in technologies that reduce power consumption in wireless networks. Consequently, discussions about network energy saving (NES) technology have commenced, particularly with the advent of the 5G-Advanced in 3GPP Release 18.

The disclosure is primarily based on the standards of the 5G mobile communication system (i.e., 3GPP NR) as defined by the 3GPP. However, the principles and concepts discussed may also be applicable to other mobile communication systems, including future 6G wireless communication systems or the existing LTE/LTE-A systems.

Figure 11:
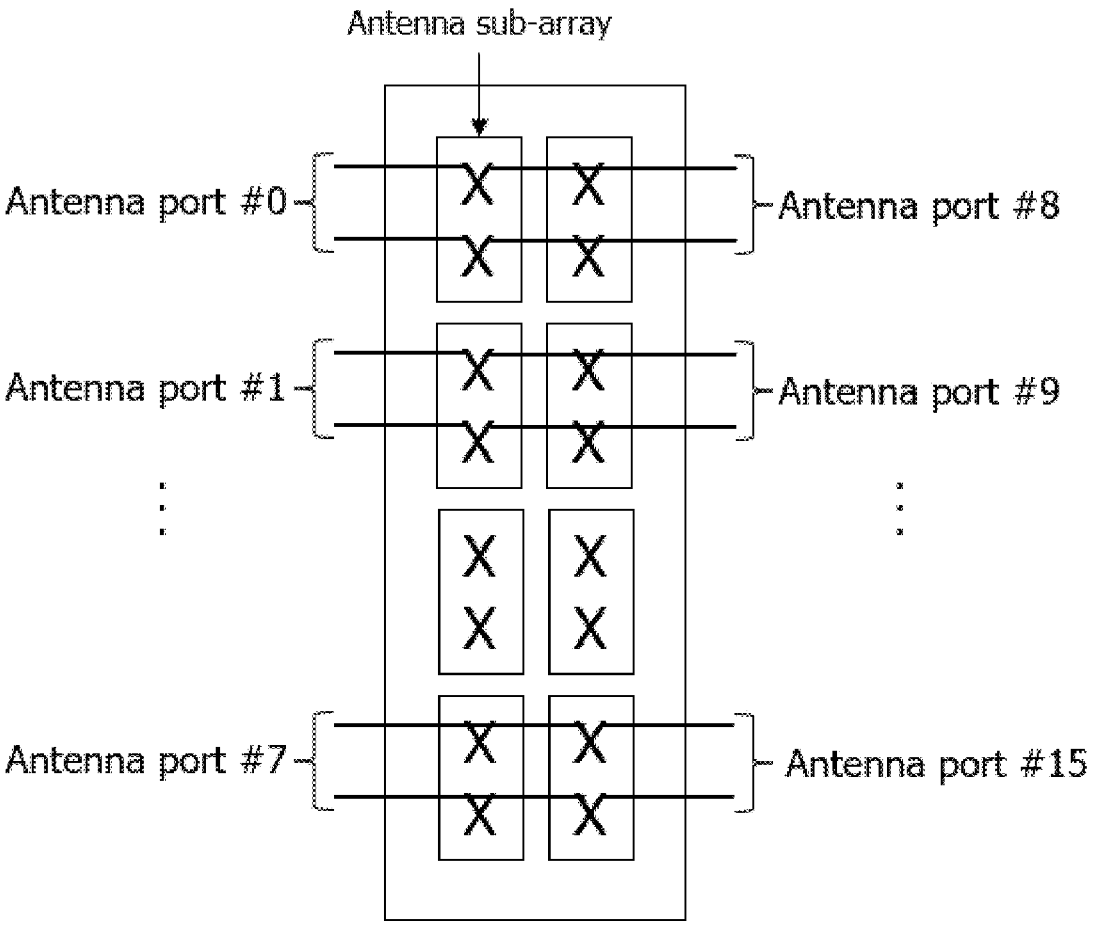
FIG. 11 illustrates a structure of an antenna in an NR base station.

FIG. 11 illustrates a structure of an antenna in an NR base station.

In the 5G mobile communication system recently deployed by mobile carriers worldwide (e.g., a wireless communication system complying with the standards of the 3GPP NR), the antenna of the base station (gNB) is structured to include one or more antenna panels with one or more sub-arrays as illustrated in FIG. 11. Further, as illustrated in FIG. 11, each sub-array includes one or more antenna elements, and each antenna element is polarized in an x-pole and a y-pole (or an H-pole and a V-pole).

In this case, the number of antenna ports configurable for downlink transmission or uplink reception at the base station may be less than or equal to the number of antenna elements. For example, as shown in FIG. 11, a pair of x-pole antenna elements of two polarized antenna elements in a sub-array forms one antenna port, and a pair of y-pole antenna elements in the same sub-array may also create another separate antenna port. Therefore, when the antenna of the base station includes 8 sub-arrays, there may be a total of 16 antenna ports with each port including two antenna elements as shown in FIG. 11. In this configuration, any given antenna port may be connected to two transceiver chains, each linked to one of the antenna elements constituting the antenna port as shown in FIGS. 12A and 12B.

Figure 12A:
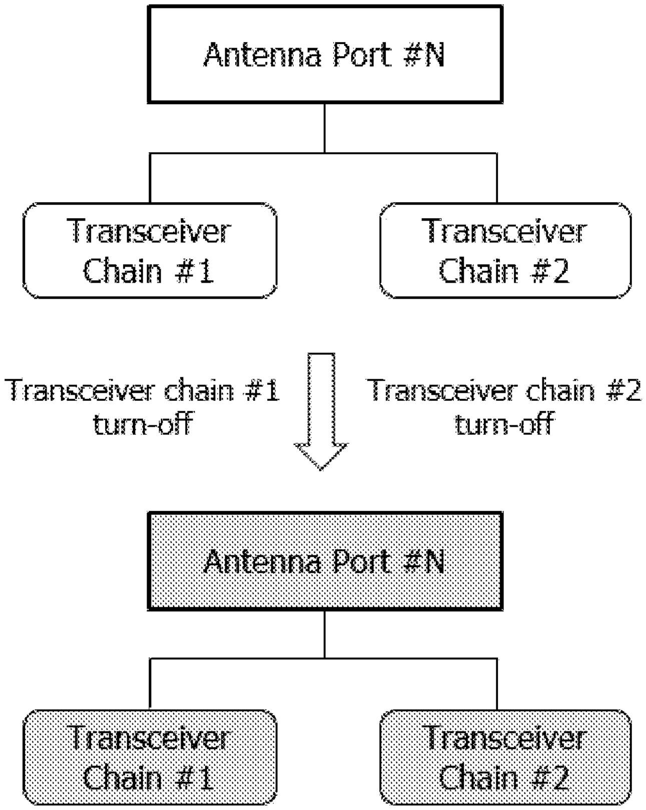
FIGS. 12A and 12B are diagrams for explaining spatial domain adaptation techniques for network energy saving (NES).
Figure 12B:
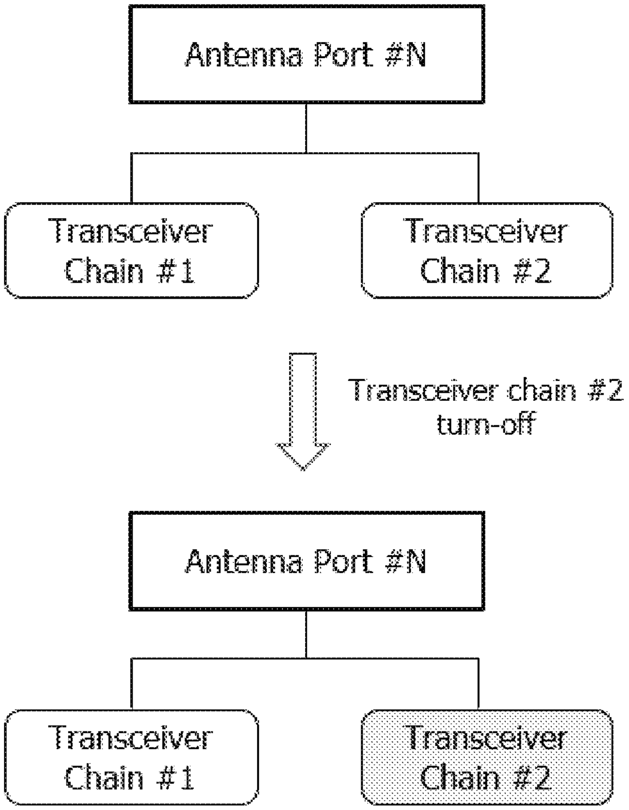

FIGS. 12A and 12B are diagrams for explaining spatial domain adaptation techniques for network energy saving (NES).

The base station activates and use all the antenna elements of all the antenna ports in transmitting and receiving (e.g., transceiving) a UE-specific wireless channel or a wireless signal with a certain terminal. However, for network energy saving (NES), only some of antenna ports or antenna elements in a base station may be activated and used in accordance with an embodiment. In the disclosure, this technique will be referred to as spatial domain adaptation. Such spatial domain adaptation techniques may be classified into type 1 and type 2 according to how to deactivate the antenna (or the corresponding transceiver chain) as illustrated in FIGS. 12A and 12B. For example, as shown in FIG. 12A, the type 1 of the spatial domain adaptation technique deactivates predetermined antenna ports of that base station by deactivating all the antenna elements connected to the predetermined antenna ports or all the corresponding transceiver chains. On the other hand, as shown in FIG. 12B, the type 2 of the spatial domain adaptation technique deactivates only some of antenna elements connected to a predetermined antenna port and keep the predetermined antenna port itself activated.

The present disclosure introduces a method for configuring CSI-RS resource and a method for reporting CSI-RS configuration based on the spatial domain adaptation techniques for network energy saving.

The base station transmits channel measurement resource (CMR) configuration information to acquire the channel state information (CSI) of a terminal (e.g., user equipment). The CMR configuration information may include non-zero-power (NZP)-CSI-RS resource configuration information, CSI-interference measurement (IM) resource configuration information, CSI-SSB resource set configuration information, etc. for channel measurement, interference measurement, beam measurement or the like of the terminal. The terminal may receive CSI-RS or SSB from the base station and perform downlink channel measurement based on the CMR configuration information received from the base station.

CMR Partitioning, and Channel Measurement and Reporting Methods Based on QMR Partitioning Hereinafter, a method for transmitting and receiving the CMR configuration information t for network energy saving and a method of a terminal for channel measurement based on the CMR configuration information according to embodiment will be described in detail.

Upon CMR configuration for a terminal, the base station may configure CMR partitioning information. In other words, the base station may define the CMR-partitioning configuration information. For example, the base station may define the CMR partitioning configuration information to be included in the existing CMR configuration information for a terminal (e.g., CSI-RS-Resourceconfig, NZP-CSI-RS-Resourceconfig, CSI-IM-Resourceconfig, ZP-CSI-RS-Resourceconfig, etc.). Or the base station may define the CMR partitioning configuration information to be included in the CSI report configuration information (e.g., CSI-ReportConfig, etc.), or the CMR partitioning configuration information to be transmitted to a corresponding terminal through UE-specific or cell-specific RRC signaling for the NES. However, the term "CMR partitioning" is not intended to limit the embodiments of the disclosure. In other words, CMR partitioning may be referred to as CMR partition, CMR subset, CSI-RS partitioning, CSI-RS resource partitioning, antenna port partitioning, antenna port sub-grouping, CSI-RS sub-grouping, CSI-RS sub-partitioning, spatial domain adaptation, spatial adaptation pattern, etc., all of which fall into the scope of the disclosure.

The CMR partitioning information may refer to configuration information for partitioning a channel measurement resource configured for a terminal into CMR partitions and for allowing the terminal to perform the channel measurement independently for each CMR partition, to obtain the CSI for each CMR partition based on the channel measurement, and to report the obtained CSI to the base station.

According to the CMR configuration and the terminal's channel measurement method, the terminal may perform channel measurement based on the CMR configuration information configured by the base station. Specifically, when NZP-CSI-RS resource configuration is made for a terminal to obtain the CSI, the terminal performs channel measurement on a resource used for transmitting the reference signal for each antenna port with respect to all the antenna ports included in the NZP-CSI-RS resource configuration information and derives downlink CSI to report to the base station based on the channel measurement. Here, the downlink CSI may include a channel quality indicator (CQI), a precoding matrix indicator (PMI), a CSI-RS resource indicator (CRI), an SS/PBCH block resource indicator (SSBRI), a layer indicator (LI), a rank indicator (RI), an L1-RSRP, an L1-SINR and/or a Capability[Set]Index.

In this case, the terminal may perform the channel measurement independently for some of channel measurement resources based on the CMR partitioning configuration (e.g., for each CMR partition based on the CMR partitioning configuration information) and the downlink CSI information may be obtained based on the channel measurement. For example, the CMR partitioning may be defined to be made in the antenna port domain with respect to the NZP-CSI-RS for the terminal. In other words, when the NZP-CSI-RS resource is configured for the terminal and the NZP-CSI-RS resource configuration information (the CSI-RS resource configuration information or the like CMR configuration information, which includes that NZP-CSI-RS resource configuration information, the foregoing CSI-report configuration information, or a separate RRC message for the NES) includes the CMR partitioning information, the terminal may perform the channel measurement in units of subsets of the antenna ports (e.g., the antenna port partitions) where that NZP-CSI-RS transmission is made. For example, when the NZP-CSI-RS resource configuration information includes 16 NZP-CSI-RS transmission antenna ports from #3000 to #3015, the corresponding CSI-RS antenna port is divided into two partitions to perform the channel measurement independently for each of the CSI-RS antenna port partition #0 (ports #3000 to #3007) and the CSI-RS antenna port partition #2 (ports #3008 to #3015), and thus configured to obtain separate CSI information. In this way, upon the CSI-RS resource configuration for the terminal (the CSI-report configuration, or the CMR partitioning configuration for the separate NES), the base station divides the CSI-RS antenna port into N partitions and configures the CSI to be measured for each CSI-RS antenna port partition, so that the terminal can report the CSI information measured for each antenna port partition to the base station.

Hereinafter, the CMR-partitioning configuration will be described in detail.

According to an embodiment of the disclosure, the CMR-partitioning configuration information may include information as follows.

1. Partitioning resource domain configuration information: spatial domain adaptation type configuration information for the NES (type 1 or type 2). Otherwise, the resource domain configuration information to be subject to the partitioning for the channel measurement with respect to the CMR, i.e., configuration information about whether it is antenna port domain partitioning (type 1) or power domain (or antenna element units which make up the same antenna port) partitioning (type 2).
2. Partitioning granularity configuration information: information about the number of CMR partitions, CMR partitioning density, etc. as configuration information about partitioning units. In the case of the type 1 spatial adaptation pattern, when information about the number of partitions is configured, each partition configuration information may be derived. For example, when a certain NZP-CSI-RS resource is configured to transmit 32 antenna ports and the information about the number of partitions is configured as 4, the terminal may define the channel measurement to be performed in units of antenna port partitions each including 8 antenna ports. Alternatively, when the CMR partitioning density is configured as ¼, a total of 32 ports for the CSI-RS transmission may be partitioned by ¼ density, for example, into 8 antenna ports for the CSI-RS to perform the channel measurement. The type 2 spatial adaptation pattern may be information about a ratio of antenna elements, through which the CSI-RS is actually transmitted, (i.e., on-state antenna elements) to the antennal elements that make up one CSI-RS transmission antenna port. Otherwise, power offset information compared to a normal state (in which all the existing antenna elements are activated for the transmission) for each antenna port.
3. Partitioning type: configuration information about the partitioning method when the CMR partitioning is made based on the partitioning granularity. For example, configuration information about contiguous partitioning or modulo-based partitioning (a non-contiguous method, an even/odd method, or the like). For example, when the number of partitions are configured as 4 (or the partition density is configured as ¼) for a total of 32 ports for the CSI-RS transmission as shown in the example of the partitioning granularity, and the contiguous configuration is made based on this partitioning type configuration information, the partition #0 may include CSI-RS ports #3000 to #3007, the partition #1 may include CSI-RS ports #3008 to #3015, the partition #2 may include CSI-RS ports #3016 to #3023, and the partition #3 may include CSI-RS ports #3024 to #3031. On the other hand, when non-contiguous partitioning or modulo-type partitioning is configured, i) partition #0 may include the antenna ports that become 0 when modulo 4 is taken as the antenna port number, i.e., the CSI-RS ports #3000, #3004, #3008, #3012, #3016, #3020, #3024, and #3028, ii) partition #1 may include the antenna ports that become 1 when modulo 4 is taken, iii) partition #2 may include the antenna ports that become 2 when modulo 4 is taken, and iv) partition #3 may include the antenna ports that become 3 when modulo 4 is taken.
4. CMR partition group ID: index for identifying a group of partitions having the same partition granularity. For example, when 32 certain port CSI-RS resources are configured, a partition group including partitions each having 16 antenna ports, a partition group including partitions each having 8 antenna ports, a partition group including partitions each having 4 antenna ports, etc. may be defined, and an index for identifying each partition group may be defined.
5. CMR partition ID: information on index for identifying a CMR partition
6. Time domain partition allocation: information on resource allocation in a time domain where CSI-RS transmission is performed based on the corresponding CMR partition configuration for each CMR partition or for each CMR partition group. This information may include offset information, duration information, and period information.

According to another embodiment of the disclosure, the CMR-partitioning configuration information may include information as follows.

1. CMR partition ID: information on index for identifying a CMR partition
2. Partitioning resource domain configuration information: information on spatial domain adaptation type configuration for the NES (type 1 or type 2). Otherwise, the resource domain configuration information to be subject to the partitioning for the channel measurement with respect to the CMR, i.e., configuration information about whether it is antenna port domain partitioning (type 1) or power domain partitioning (type 2)
3. CMR partition configuration information: CMR partition configuration information may be defined to be directly configured at the base station. To this end, a bitmap indication region may be defined for each CSI-RS antenna port to configure the CMR partition. The CMR partition configuration information may be configured based on the defined bitmap indication region. In this case, the size of that bitmap information region may be determined based on the number of corresponding CSI-RS antenna ports or the maximum number (e.g., 32) of CSI-RS antenna ports.

As another method of configuring the CMR partition, a CMR partition list and indexes may be defined. For example, Table 5 below shows a CMR partition list including CMR partitions defined by dividing CSI-RS of 16 antenna ports and indexes (e.g., CMR partitioning ID) each indicating corresponding CMR partition. Each CMR partition may be associated with a corresponding CSI-RS antenna port number. The CMR partition list may be configured in various ways, and the spirit of the disclosure may also be applied thereto.

Alternatively, a plurality of CMR partition tables may be defined for each CSI-RS antenna port, and an index for each CMR partition table to be used for transmitting, measuring or reporting a CSI-RS among the defined CMR partition tables may be defined (e.g., configured) at the base station. For example, N CMR partition tables #0 to #(N−1) may be defined for the CSI-RS of 16 antenna ports may be defined, and then a CMR partition table index may be defined to indicate the CSI-RS transmission/measurement/report of 16 port. Likewise, CMR partitioning tables may be respectively defined for the CSI-RS of 2 antenna ports, 4 antenna ports, 8 antenna ports, 12 antenna ports, 24 antenna port, and 32 antenna ports, respectively, and an index for each CMR partitioning table may be defined.

4. Time domain partition allocation: information on resource allocation in a time domain for CSI-RS transmission based on the corresponding CMR partition configuration for each CMR partition or for each CMR partition group. This information may include offset information, duration information, and period information.

Table 5 shows a CMR partition list for CSI-RS of 16 ports.

TABLE 5

| CMR partition index | CSI-RS antenna port # |
|---|---|
| 0 | #0, #1, #2, #3, #4, #5, #6, #7 |
| 1 | #8, #9, #10, #11, #12, #13, #14, #15 |
| 2 | #0, #1, #2, #3 |
| 3 | #4, #5, #6, #7 |
| 4 | #8, #9, #10, #11 |
| 5 | #12, #13, #14, #15 |

Hereinafter, how the terminal reports a channel measurement result based on the CMR partitioning configuration will be described in detail.

The base station may perform CMR partitioning configuration to enable the terminal to report a channel measurement result for each CMR partition. In this case, the CMR partitioning configuration information may also be included i) in the CSI-report configuration information CSI-report-config as described above, ii) in the CMR configuration information, or iii) in an RRC message separately defined for the NES.

The CSI report information of the terminal based on the CRM partition configuration may further include information such as a CMR partition indicator (CPI) and/or a CMR partition group indicator (CPGI) in addition to the foregoing channel quality indicator (CQI), precoding matrix indicator (PMI), CSI-RS resource indicator (CRI), SS/PBCH block resource indicator (SSBRI), layer indicator (LI), rank indicator (RI), L1-RSRP, L1-SINR and/or Capability[Set]Index. Thus, upon the CSI-report configuration for a certain terminal for which the CMR partitioning is configured, report quantity configuration information may be configured to further include the CPI information or the CPGI information. Accordingly, when the terminal reports the CSI to the base station, information on CMR partition ID or CMR partition group ID associated with the channel measurement may be included based on that report quantity configuration.

The CSI reporting mode of the terminal may be defined based on one or more CRM partitions. In other words, the terminal's CSI reporting mode may be defined and configured based on one or more CRM partitions for network energy saving. For example, the terminal's CSI reporting information may be the channel state information (e.g., CQI, RI, LI, L1-RSRP, etc.) of the best CRM partition for each CMR partition or for each CMR partition group. Alternatively, the terminal's CSI report information based on the CRM partition configuration may be average channel state information (e.g., CQI, RI, LI, L1-RSRP, etc.) about all the CMR partitions configured for a certain CSI-RS resource. Alternatively, the terminal's CSI report information based on the CRM partition configuration may be average channel state information (e.g., CQI, RI, LI, L1-RSRP, etc.) for each CMR partition group configured for a certain CSI-RS resource. The terminal's CMR partition-based CSI reporting mode is configured at the base station and transmitted to each terminal through the corresponding CSI-reportConfig message/information. The terminal may transmit the CMR partitioning-based CSI report information to the base station based on the corresponding CSI reporting mode configuration information.

A Spatial Adaptation Pattern Configuration Method, and the Terminal's Channel Measurement and Reporting Methods Based on the Spatial Adaptation Pattern Configuration Method Hereinafter, a method for defining spatial adaptation pattern and applying CMR partitioning through the defined spatial adaptation pattern according to an embodiment will be described in detail.

The base station and the terminal may define the spatial adaptation pattern for the spatial domain adaptation. The spatial adaptation pattern may refer to an antenna port on/off pattern or an antenna element on/off pattern. According to the spatial adaptation pattern, some of antenna elements or antenna ports mounted at the base station are turned off for network energy saving when transceiving a signal. For example, when the base station includes a total of 16 antenna ports #0 to #15, a spatial adaptation pattern #0 may be configured to turn on only 8 antenna ports #0 to #7 among all the antenna ports #0 to #15, and a spatial adaptation pattern #1 may be configured to turn on the remaining 8 antenna ports #8 to #15.

According to an embodiment, the spatial adaptation pattern may be defined in units of a ratio of antenna elements/ports turned on (or a ratio of antenna elements/ports turned off) to all the antenna elements/ports, and a sub-pattern may be defined in units of a set of antenna element/ports turned on within one spatial adaptation pattern. In other words, when the base station includes a total of 16 antenna ports #0 to #15, the spatial adaptation pattern #0 may be defined to turn on only ½ of 16 antenna ports #0 to #15, Within the defined spatial adaptation pattern #0, a sub-pattern #0 may be defined to turn on only 8 antenna ports #0 to #7 and a sub-pattern #1 may be defined to turn on only 8 antenna ports #8 to #15. Likewise, a spatial adaptation pattern #1 may be defined to turn on only ¼ of all the antenna ports. Within the spatial adaptation pattern #1, a sub-pattern #0 may be defined to turn on only 4 antenna ports #0 to #3, a sub-pattern #1 may be defined to turn on only 4 antenna ports #4 to #7, a sub-pattern #2 may be defined to turn on only 4 antenna ports #8 to #11, and a sub-pattern #3 may be defined to turn on only 4 antenna ports #12 to #15.

According to another embodiment, the antenna port configuration information for each spatial adaptation pattern may be configured directly at the base station similar to the above-described method of configuring the CMR partition configuration information. For example, the antenna port configuration information for a spatial adaptation pattern may be configured by a bitmap method for each antenna port, or the antenna port configuration information for a certain spatial adaptation pattern may be defined to be transmitted in such a manner that an index is allocated to a spatial adaptation pattern table/list of antenna port combinations after that table/list is defined or configured at the base station like the CMR partition table/list.

According to another embodiment, the spatial adaptation pattern table/list may be defined for each antenna port number (i.e., for each number of antenna ports, N=2, 4, 8, 12, 16, 24, and 32). In other words, a spatial adaptation pattern table may be defined for each antenna port number as shown in Tables 6 and 7 similarly to the CMR partition table defined for each antenna port number. In this case, the spatial adaptation pattern table for each antenna port may be further classified and defined according to spatial domain adaptation types.

Table 6 shows spatial adaptation patterns for type 1 with respect to CSI-RS of 16 ports.

TABLE 6

| Spatial adaptation pattern index for type 1 | CSI-RS antenna port # |
|---|---|
| 0 | #0, #1, #2, #3, #4, #5, #6, #7 |
| 1 | #8, #9, #10, #11, #12, #13, #14, #15 |
| 2 | #0, #1, #2, #3 |
| 3 | #4, #5, #6, #7 |
| 4 | #8, #9, #10, #11 |
| 5 | #12, #13, #14, #15 |

Table 7 shows spatial adaptation patterns for type 2 with respect to CSI-RS of 16 ports.

TABLE 7

| Spatial adaptation pattern index for type 2 | CSI-RS power offset or portion of active antenna elements per CSI-RS antenna port |
|---|---|
| 0 | −3 dB (or ½) |
| 1 | −6 dB (or ¼) |
| 2 | −9 dB (or ⅛) |

The spatial adaptation pattern configuration information may be configured by the base station through UE-specific/UE-group common or cell-specific higher layer signaling as an information area of a new RRC message or the existing RRC message (e.g., CSI-RS-Resourceconfig, NZP-CSI-RS-Resourceconfig, CSI-reportConfig, etc.). As described above, the spatial adaptation pattern configuration information configured by the base station may include spatial adaptation pattern ID information, spatial adaptation type information (type 1 or type 2), spatial adaptation density information, antenna port configuration information, sub-pattern ID, etc.

Upon the CMR configuration, the terminal configured with one or more spatial adaptation patterns may have enabling information about the specific spatial adaptation pattern. That spatial adaptation pattern enabling information includes index information about a spatial adaptation pattern to be enabled (or additional sub-pattern index information). In this case, for example, when the CMR configuration information (e.g., NZP-CSI-RS-resourceConfig information, CSI-RS-Resourceconfig information, CSI-IM-Resourceconfig information, etc.) for the terminal includes enabling information about a specific spatial adaptation pattern, the terminal may additionally perform a separate second channel measurement process for some antenna ports among the CSI-RS antenna ports allocated based on the enabled spatial adaptation pattern information (where the spatial domain adaptation for type 1 is enabled) in addition to a first channel measurement process (or a CSI process to which a channel measurement process to be described later may also belong) based on all the antenna ports according to the existing CSI-RS resource allocation information. Alternatively, the separate second channel measurement process for all the antenna ports of the same CSI-RS (where the spatial domain adaptation for type 2 is enabled) may be additionally performed along with the first channel measurement process based on all the antenna ports according to the existing CSI-RS resource allocation information. Alternatively, the definition may be made to perform only the second channel measurement process based on the spatial adaptation pattern rather than the existing first channel measurement process. In this case, the definition may be made to enable only one spatial adaptation pattern for a certain CMR (where, a separate channel measurement process for each sub-pattern may be additionally configured when one spatial adaptation pattern includes one or more sub-patterns as described above), or the definition may be made to enable a plurality of spatial adaptation patterns. Further, upon the CMR configuration, the spatial adaptation pattern enabling configuration information may include time domain allocation information for the channel measurement process based on the corresponding spatial adaptation pattern, and the time domain allocation information may include offset information, period information, duration information, etc. In this case, the time domain allocation information may be configured and interpreted for nominal slots where CSI-RS (or SSB) transmission is actually performed based on the CMR configuration.

According to another embodiment, the spatial adaptation pattern for the terminal may be enabled based on the CSI-reportConfig information. In this case, the channel measurement process based on the spatial adaptation pattern may be the same as described above. Accordingly, the terminal may send the base station a CSI report according to a second channel measurement result based on the spatial adaptation pattern (and CSI reports according to third, fourth, . . . channel measurement results when the sub-pattern is defined or the plurality of spatial adaptation patterns are enabled) in addition to the existing CSI report according to a first channel measurement result based on all the antennal ports of the CSI-RS. Even in this case, as described above, upon the CSI reporting configuration, the spatial adaptation pattern enabling configuration information may include time domain allocation information for reporting the channel measurement result based on the corresponding spatial adaptation pattern, and the time domain allocation information may include offset information, period information, duration information, etc. In this case, the time domain allocation information may be configured and interpreted for nominal slots configured to report the CSI actually based on the existing first channel measurement reporting configuration (in the case of periodic or semi-persistent report). However, when aperiodic reporting is configured, CSI triggering information of DCI may include an information area to additionally indicate whether it is spatial adaptation pattern-based CSI reporting or legacy CSI reporting (i.e., the first channel measurement result).

According to another embodiment, a specific spatial adaptation pattern may be activated or deactivated based on MAC control element (CE) signaling or UE-specific/group common downlink control information (DCI). In this case, the MAC CE signaling or DCI may include information about the ID of a spatial adaptation pattern (or the ID of an additional sub-pattern) desired to be activated along with ID information of a CSI-RS resource or a CSI-RS resource set underlying the activation of each spatial adaptation pattern. The MAC CE signaling or DCI may further include allocation information in a time domain where the spatial adaptation pattern is activated. The time domain allocation information may include slot offset information, duration information, period information, etc. The time domain allocation information may be configured/interpreted for slots or may be configured/interpreted for nominal slots where the CSI-RS transmission is performed.

Channel Measurement Configuration and Reporting Configuration Methods Based on Type 1 Spatial Adaptation Pattern Hereinafter, a method of a terminal for performing channel measurement and reporting based on the type 1 spatial adaptation pattern configuration according to an embodiment will be described in detail.

According to embodiment, the terminal may perform the channel measurement based on the CMR configuration information configured by the base station. Specifically, when NZP-CSI-RS resource configuration is made for the terminal to obtain channel state information (CSI), the terminal performs the channel measurement on a resource designated for transmitting the reference signal for each antenna port with respect to all the antenna ports included in the NZP-CSI-RS resource configuration information. The terminal derives the downlink CSI to report to the base station based on the channel measurement. Here, the CSI may include a channel quality indicator (CQI), a precoding matrix indicator (PMI), a CSI-RS resource indicator (CRI), an SS/PBCH block resource indicator (SSBRI), a layer indicator (LI), a rank indicator (RI), an L1-RSRP, an L1-SINR and/or a Capability[Set]Index.

When the type 1 spatial adaptation pattern is configured/enabled/activated for the terminal by the base station, that terminal may perform the channel measurement for some ports according to the configuration of the spatial adaptation pattern among the CSI-RS transmission antenna ports of the corresponding CSI-RS resource (CMR), based on the spatial adaptation pattern, for example, based on configuration information of the corresponding CMR. In this case, according to the existing channel measurement operations, the terminal may also perform the channel measurement for the CSI-RS transmission based on the CMR configuration underlying the spatial adaptation pattern. Alternatively, when the spatial adaptation pattern is configured/enabled/activated, only the channel measurement based on the spatial adaptation pattern may be defined to be performed.

In other words, when the NZP-CSI-RS resource is configured for the terminal, and the corresponding NZP-CSI-RS resource configuration information (CSI-RS resource configuration information and the like CMR configuration information including the corresponding NZP-CSI-RS resource configuration information or the foregoing CSI-report configuration information) includes the spatial adaptation pattern enabling information, or when the spatial adaptation pattern is activated through separate MAC CE signaling or DCI as described above, the terminal configures the CSI process for performing the channel measurement by receiving only the CSI-RS transmission from the resources corresponding to a subset of the antenna ports where the NZP-CSI-RS transmission is performed, for example, the antenna ports where the transmission is activated (i.e., turned on) by the spatial adaptation pattern. For example, when NZP-CSI-RS resource configuration information includes 16 NZP-CSI-RS transmission antenna ports #3000 to 3015, and a spatial adaptation pattern #0 configured to activate only 8 antenna ports #3000 to #3007 for the transmission is enabled or activated, the terminal may perform the channel measurement based on the CSI-RS transmitted through a transmission resource corresponding to 8 antenna ports #3000 to #3007 among 16 ports of the corresponding NZP-CSI-RS transmission resource. In this case, the corresponding terminal may also perform a legacy channel process (i.e., the channel measurement based on the CSI-RS of 16 ports). Alternatively, the terminal may not perform the legacy channel process. As described above, when the spatial adaptation pattern is configured based on the activated port density, and a plurality of sub-patterns which are different in the activated states of the antenna ports is configured within the same spatial adaptation pattern, the channel measurement may be performed by configuring a separate CSI process in units of each sub-pattern. In other words, a sub-pattern #0 (ports #3000 to #3007) and a sub-pattern #1 (ports #3008 to #3015) may be configured and enabled/activated based on the spatial adaptation pattern of ½ density. In this case, the channel measurements may be separately performed based on the CSI-RS transmission resources of the sub-pattern #0 and the sub-pattern #1, respectively. Alternatively, even when the plurality of spatial adaptation patterns is enabled or activated for the reference CMR, the separate channel measurement may be performed in units of a subset of CSI-RS antenna ports corresponding to each spatial adaptation pattern. In this regard, each channel measurement may be performed independently, and thus the configuration may be performed to obtain separate CSI information.

As described above, when a separate CSI process is defined in units of the spatial adaptation pattern to perform the channel measurement independently, the terminal may perform the CSI reporting for each corresponding spatial adaptation pattern based on the configuration of the base station. In this case, the reporting on the channel measurement result from the existing legacy CSI process and the channel measurement result from the CSI process based on the spatial adaptation pattern may be configured to be multiplexed and transmitted through the same slot or to be transmitted through different slots in the form of time division multiplexing (TDM). To this end, upon periodic or semi-persistent CSI reporting configuration at the base station, time domain allocation information may be included to report the channel measurement result based on the corresponding spatial adaptation pattern, and the time domain allocation information may include the offset information, the period information, the duration information, etc. In this case, the time domain allocation information may be configured and interpreted for nominal slots configured to report the CSI actually based on the legacy channel measurement reporting configuration (in the case of periodic or semi-persistent report). However, when aperiodic reporting is configured, CSI triggering information of DCI may be defined to include an information area to additionally indicate whether it is spatial adaptation pattern-based CSI reporting or legacy CSI reporting (i.e., the foregoing first channel measurement result).

According to another embodiment of configuring the CSI reporting for the type 1 spatial adaptation pattern, the CSI reporting may be configured for the plurality of type 1 spatial adaptation patterns through one CSI-reportConfig message/information. However, different type 1 spatial adaptation patterns included in the same CSI-reportConfig message/information may be limited to patterns referencing the same CMR configuration information (i.e., spatial adaptation patterns based on the same CSI-RS transmission resource configuration information), and may be additionally limited to patterns having the same antenna port number (i.e., patterns having the same density or sub-patterns in the case where density-based type 1 spatial adaptation patterns are configured). Alternatively, regardless of the CMR to be referenced, the CSI reporting may be defined to be configured through one CSI-reportConfig with respect to the CSI-reporting based on the same CSI-RS antenna port number. When the CSI reporting for one or more type 1 spatial adaptation patterns is configured through one CSI-reportconfig, the corresponding configuration information area may be configured as two types: a pattern-common information area and a pattern-specific information area. The pattern-common information area refers to an information area that is commonly configured for the plurality of type 1 spatial adaptation patterns for which the CSI reporting is configured through that CSI-reportconfig (or the CSI reporting based on the same CSI-RS antenna port number), in which one configuration value may be equally applied to all the type 1 spatial adaptation patterns. On the other hand, the pattern-specific the information area refers to an information area that is configured for each type 1 spatial adaptation pattern, in which a separate information area is defined for each spatial adaptation pattern and configured independently. For example, reportconfigId, carrier, reportQuantity, or the like information area is defined as the pattern-common information area so that a configuration value based on a single information area can be applied equally to all the type 1 spatial adaptation patterns included in that CSI-reportconfig. On the other hand, reportSlotConfig (slot period and offset), cqi-Table, codebookConfig, or the like information area is defined as the pattern-specific information area and configured and applied independently through a separate information area for each pattern.

In addition, for the CSI reporting based on the spatial adaptation pattern, the CSI reporting information may further include spatial adaptation pattern index information (or sub-pattern index information).

Channel Measurement Configuration and Reporting Configuration Methods Based on Type 2 Spatial Adaptation Pattern Hereinafter, a method of a terminal for performing channel measurement and reporting based on the type 2 spatial adaptation pattern configuration according to an embodiment will be described in detail.

When the type 2 spatial adaptation pattern is configured for the terminal, a separate CMR (e.g., NZP-CSI-RS resource, etc.) configuration may be performed. In this case, the separate CMR information may be included in the type 2 spatial adaptation pattern configuration message/information and transmitted to the corresponding terminal.

Alternatively, the CMR information may include information about whether the CSI-RS transmission based on that CMR configuration includes CSI transmission based on the type 2 spatial adaptation pattern, and CSI transmission enabling based on the type 2 spatial adaptation pattern, etc. In this case, all the CSI-RS transmissions based on the CMR configuration information may be defined to comply with the type 2 spatial adaptation pattern, or only some CSI-RS transmissions among those CSI-RS transmissions may be defined to comply with the type 2 spatial adaptation pattern. In this way, when some CSI-RS transmissions comply with the type 2 spatial adaptation pattern, configuration information on resources designated for performing the CSI-RS transmissions based on the type 2 spatial adaptation pattern among the CSI-RS transmission resources based on the corresponding CMR is included. The CSI-RS transmission resource configuration information based on the type 2 spatial adaptation pattern may be time domain resource configuration information which may include offset information, duration information, and period information. In this case, the time domain resource configuration information may be defined to be configured by the base station based on actual CSI-RS transmission resources (e.g., CSI-RS transmission slots) according to the corresponding CMR configuration and interpreted by the terminal. In this case, a predetermined CMR may be limited to include only one type 2 spatial adaptation pattern, or to enable configuration up to N type 2 spatial adaptation patterns, where N may have a fixed value, may be set by the base station, or may be set based on the capability of the terminal.

The CSI-RS transmission based on the type 2 spatial adaptation pattern may be defined to be dynamically activated/deactivated through MAC CE signaling or UE-specific/UE-group common DCI by the base station. In other words, when the CMR configured for the terminal involves the type 2 spatial adaptation pattern, or when a separate type 2 spatial adaptation pattern is configured through RRC signaling, the base station may activate or deactivate the CSI-RS transmission based on that type 2 spatial adaptation pattern through the MAC CE signaling or the UE-specific/UE-group common DCI, and the terminal may determine whether the CSI-RS based on the type 2 spatial adaptation pattern configured for the activated or deactivated CSI-RS transmission is transmitted or not.

In this way, when the CSI-RS transmission based on the type 2 spatial adaptation pattern or the channel measurement is configured/activated/indicated for the terminal, the terminal may perform the channel measurement by separately generating a CSI process based on the type 2 spatial adaptation pattern. Alternatively, a terminal may perform the channel measurement based on the same CMR configuration as the existing one, regardless of the type 2 spatial adaptation pattern configuration. In this case, the corresponding channel measurement result value based on a legacy procedure may be converted and reported according to the configured type 2 spatial adaptation pattern.

The CSI reporting based on the type 2 spatial adaptation pattern may be configured by the base station. As one of configuration methods, the base station may configure the CSI reporting for the plurality of type 2 spatial adaptation patterns based on the same CSI-RS transmission antenna port through one CSI-reportconfig. In this case, the CSI-reportconfig information area configuration may be classified into two types: i) a pattern-common information area and ii) a pattern-specific information area. The pattern-common information area refers to an information area that is commonly configured for the plurality of type 2 spatial adaptation patterns for which the CSI reporting is configured through that CSI-reportconfig, in which one configuration value may be equally applied to all the type 2 spatial adaptation patterns. On the other hand, the pattern-specific the information area refers to an information area that is configured for each type 2 spatial adaptation pattern, in which a separate information area is defined for each spatial adaptation pattern and configured independently. For example, reportconfigId, carrier, reportQuantity, or the like information area is defined as the pattern-common information area so that a configuration value based on a single information area can be applied equally to all the type 2 spatial adaptation patterns included in that CSI-reportconfig.

On the other hand, reportSlotConfig (slot period and offset), cqi-Table, codebookConfig, or the like information area is defined as the pattern-specific information area and configured and applied independently through a separate information area for each pattern.

In addition, for the CSI reporting based on the spatial adaptation pattern, the CSI reporting information may further include spatial adaptation pattern index information (or sub-pattern index information).

As described above, the present disclosure is to provide a method and apparatus for performing channel measurement and generating CSI separately for each spatial adaptation pattern. According to embodiments, the terminal may receives spatial adaptation pattern (or CMR partitioning) configuration information from the base station. The corresponding spatial adaptation pattern information may include CSI-RS resource configuration information, spatial domain adaptation type information, spatial adaptation pattern ID information, and time domain allocation information for each spatial adaptation pattern, which are referenced.

The embodiments described in this disclosure may be implemented either independently or in a combined manner. Moreover, the terminology used in this disclosure is chosen for clarity and ease of understanding, and the disclosure remains applicable even if other terms with the same meanings are employed.

Figure 13:
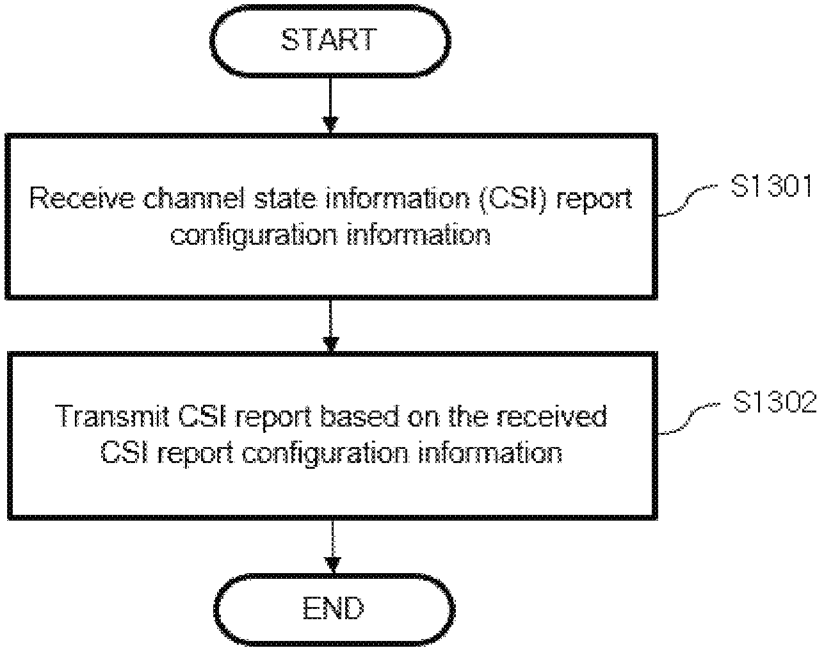
FIG. 13 is a flowchart for an operation method of a UE (e.g., terminal) according to an embodiment of the disclosure.

FIG. 13 is a flowchart illustrating an operation method of a UE (e.g., a terminal) according to an embodiment of the disclosure.

Referring to FIG. 13, a terminal (e.g., user equipment) receives channel state information (CSI) report configuration information from a base station (S1301). The terminal generates a CSI report based on the CSI report configuration information received from the base station and transmit the CSI report to the base station (S1302). In other words, the terminal receives the CSI report configuration information from the base station, performs CSI measurement/calculation based on the received CSI report configuration information to obtain the CSI report, and transmits CSI report as CSI feedback to the base station. Here, the CSI report configuration information may include at least one sub configuration information, and the CSI report may include at least one CSI obtained in units of sub configuration based on the at least one sub configuration information.

The at least one CSI may be measured and obtained in units of sub configuration, and a downlink channel measurement process for obtaining the at least one CSI may be allocated in units of sub configuration.

In addition, the maximum number of sub configuration information, which can be included in the CSI report configuration information, may depend on the capability of the terminal.

Figure 14:
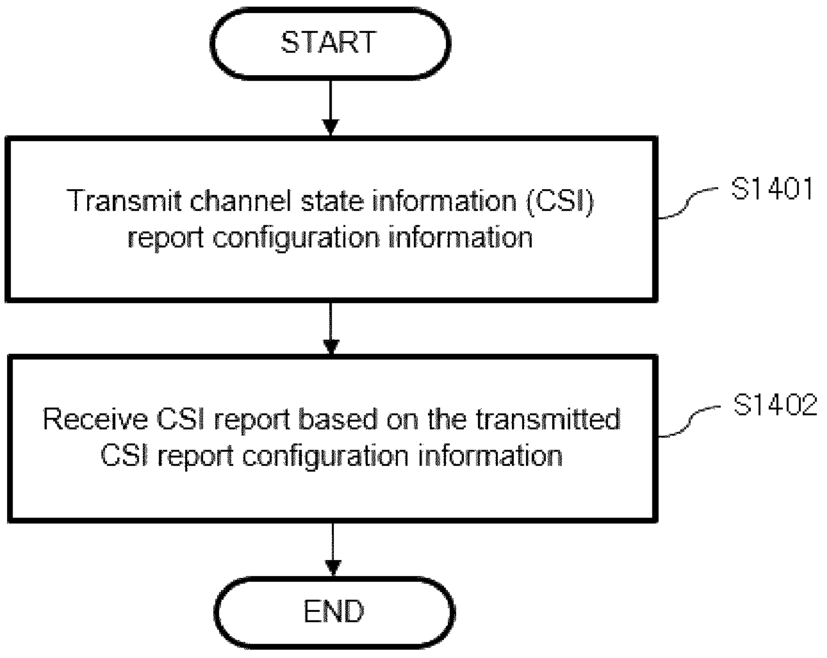
FIG. 14 is a flowchart for an operation method of a base station according to an embodiment of the disclosure.

FIG. 14 is a flowchart for an operation method of a base station according to an embodiment of the disclosure.

Referring to FIG. 14, a base station transmits channel state information (CSI) report configuration information to a terminal (S1401). The base station receives a CSI report from the terminal (S1402). The CSI report is generated by the terminal based on the CSI report configuration information. In other words, the base station transmits the CSI report configuration information to the terminal, the terminal obtains CSI by performing CSI measurement/calculation based on the CSI report configuration information and performs CSI feedback to transmit the CSI report to the base station. The base station receives the CSI feedback, i.e., the CSI report from the terminal. Here, the CSI report configuration information may include at least one sub configuration information, and the CSI report may include at least one CSI obtained in units of sub configuration based on the at least one sub configuration information.

The at least one CSI may be measured and obtained in units of sub configuration, and a downlink channel measurement process for obtaining the at least one CSI may be allocated in units of sub configuration.

In addition, the CSI report configuration information may include the maximum number of sub configuration information. The maximum number of sub configuration information may depend on the capability of the terminal.

The embodiments described up to now may be implemented through various means. For example, the embodiments may be implemented by hardware, firmware, software, or a combination thereof. Details will be described with reference to the accompanying drawings.

Figure 15:
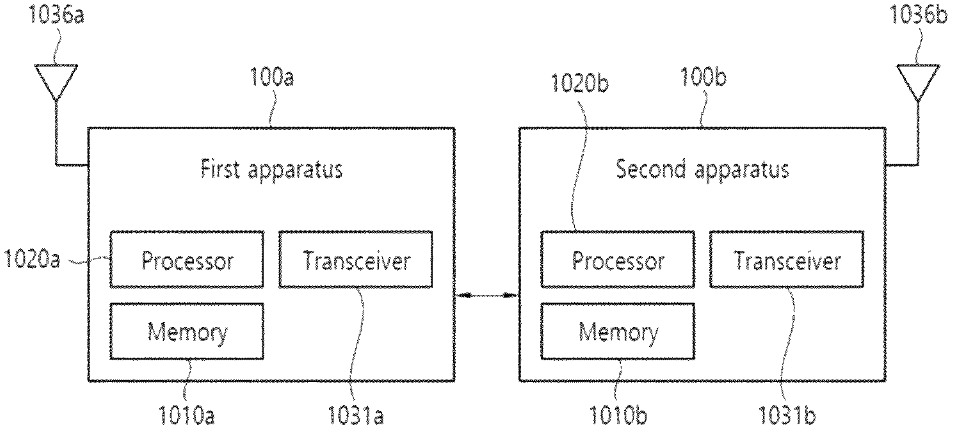
FIG. 15 is a block diagram illustrating apparatuses according to an embodiment of the disclosure.

FIG. 15 is a block diagram illustrating apparatuses according to an embodiment of the disclosure.

Referring to FIG. 15, a wireless communication system may include a first apparatus 100*a* and a second apparatus 100*b*.

The first apparatus 100*a* may include a base station, a network node, a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medical apparatus, a finance technology (FinTech) apparatus (or a financial apparatus), a security apparatus, a climate/environment apparatus, an apparatus related to a 5G service, or other apparatuses related to the fourth industrial revolution.

The second apparatus 100*b* may include a base station, a network node, a transmission terminal, a reception terminal, a wireless apparatus, a radio communication device, a vehicle, a vehicle with an autonomous driving function, a connected car, an unmanned aerial vehicle (UAV), an artificial intelligence (AI) module, a robot, an augmented reality (AR) apparatus, a virtual reality (VR) apparatus, a mixed reality (MR) apparatus, a hologram apparatus, a public safety apparatus, a machine-type communication (MTC) apparatus, an Internet of things (IoT) apparatus, a medial apparatus, a finance technology (FinTech) apparatus (or a financial apparatus), a security apparatus, a climate/environment apparatus, an apparatus related to a 5G service, or other apparatuses related to the fourth industrial revolution.

The first apparatus 100*a* may include at least one processor such as a processor 1020*a*, at least one memory such as a memory 1010*a*, and at least one transceiver such as a transceiver 1031*a*. The processor 1020*a* may be tasked with executing the previously mentioned functions, procedures, and/or methods. The processor 1020*a* may be capable of implementing one or more protocols. For example, the processor 1020*a* may perform and manage one or more layers of a radio interface protocol. The memory 1010*a* may be connected to the processor 1020*a*, and configured to store various types of information and/or instructions. The transceiver 1031*a* may be connected to the processor 1020*a*, and controlled to transceive radio signals.

The second apparatus 100*b* may include at least one processor such as a processor 1020*b*, at least one memory device such as a memory 1010*b*, and at least one transceiver such as a transceiver 1031*b*. The processor 1020*b* may be tasked with executing the previously mentioned functions, procedures, and/or methods. The processor **1020*b* may be capable of implementing one or more protocols. For example, the processor 1020*b* may manage one or more layers of a radio interface protocol. The memory 1010*b* may be connected to the processor 1020*b* and configured to store various types of information and/or instructions. The transceiver 1031*b* may be connected to the processor 1020*b*** and controlled to transceive radio signaling.

The memory **1010*a* and/or the memory 1010*b* may be respectively connected inside or outside the processor 1020*a* and/or the processor 1020*b*** and connected to other processors through various technologies such as wired or wireless connection.

The first apparatus **100*a* and/or the second apparatus 100*b* may have one or more antennas. For example, an antenna 1036*a* and/or an antenna 1036*b*** may be configured to transceive a radio signal.

Figure 16:
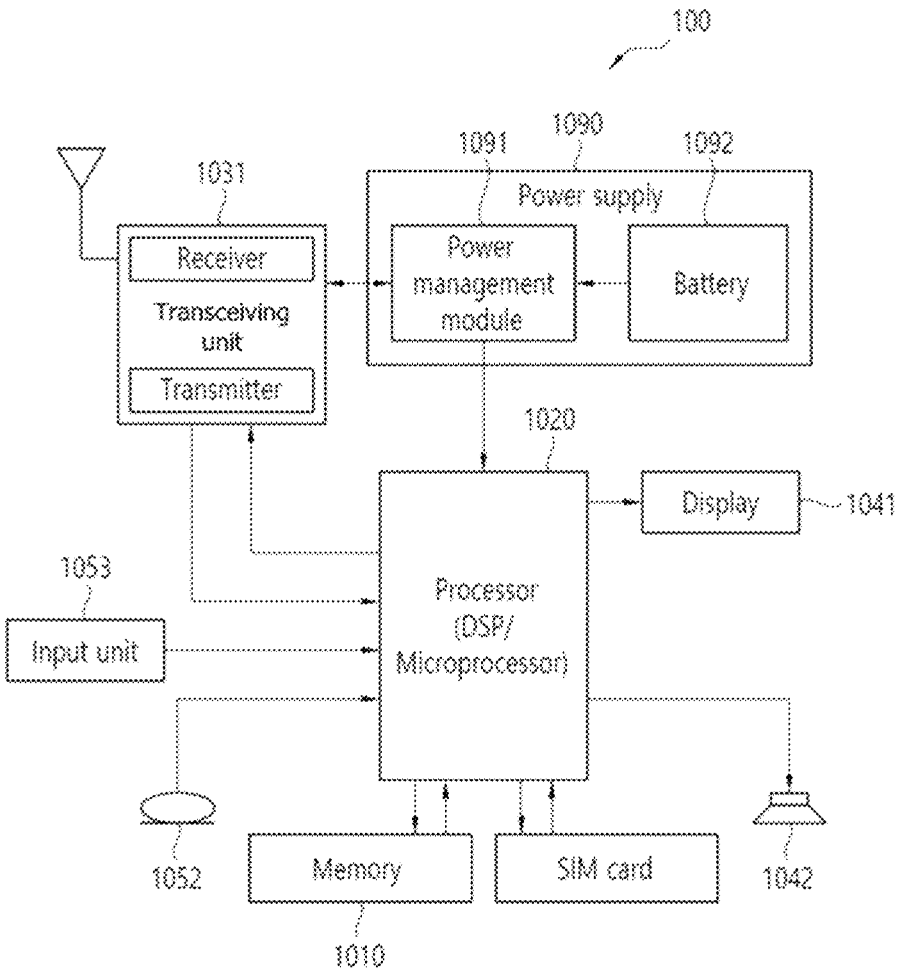
FIG. 16 is a block diagram showing a terminal according to an embodiment of the disclosure.

FIG. 16 is a block diagram showing a terminal according to an embodiment of the disclosure.

In particular, FIG. 16 illustrates the previously described apparatus of FIG. 15 in more detail.

The apparatus includes a memory 1010, a processor 1020, a transceiving unit 1031 (e.g., transceiving circuit), a power management module 1091 (e.g., power management circuit), a battery 1092, a display 1041, an input unit 1053 (e.g., input circuit), a loudspeaker 1042, a microphone 1052, a subscriber identification module (SIM) card, and one or more antennas. Some of constituent elements is referred to as a unit in the disclosure. However, the embodiments are not limited thereto. For example, such term "unit" is also referred to as a circuit block, a circuit, or a circuit module.

The processor 1020 may be configured to implement the proposed functions, procedures, and/or methods described in the disclosure. The layers of the radio interface protocol may be implemented in the processor 1020. The processor 1020 may include an application-specific integrated circuit (ASIC), other chipsets, logic circuits, and/or data processing devices. The processor 1020 may be an application processor (AP). The processor 1020 may include at least one of a digital signal processor (DSP), a central processing unit (CPU), a graphics processing unit (GPU), and a modulator and demodulator (MODEM). For example, the processor 1020 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel®, KIRIN™ series of processors made by HiSilicon®, or the corresponding next-generation processors.

The power management module 1091 manages a power for the processor 1020 and/or the transceiver 1031. The battery 1092 supplies power to the power management module 1091. The display 1041 outputs the result processed by the processor 1020. The input unit 1053 may be an individual circuit that receives an input from a user or other devices and convey the received input with associated information to the processor 1020. However, the embodiments are not limited thereto. For example, the input unit 1053 may be implemented as at least one of touch keys or buttons to be displayed on the display 1041 when the display 1041 is capable of sensing touches, generating related signals according to the sensed touches, and transferring the signals to the processor 1020. The SIM card is an integrated circuit used to securely store international mobile subscriber identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include read-only memory (ROM), random access memory (RAM), flash memory, a memory card, a storage medium, and/or other storage device. The embodiments described in the disclosure may be implemented as software program or application. In this case, such software program or application may be stored in the memory 1010. In response to a predetermined event, the software program or application stored in the memory 1010 may be fetched and executed by the processor 1020 for performing the function and the method described in this disclosure. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020, receives, and transmits a radio signal under control of the processor 1020. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives audio input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 for a user's recognition or for convenience.

Figure 17:
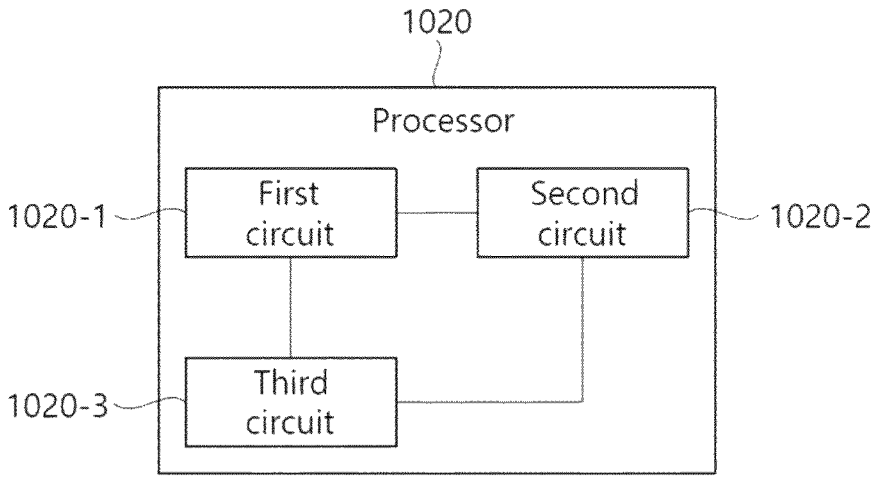
FIG. 17 is a block diagram of a processor.

FIG. 17 is a block diagram of a processor.

Referring to FIG. 17, a processor 1020 may include a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an application-specific integrated circuit (ASIC) or an application processor (AP) and may include at least one of a digital signal processor (DSP), a central processing unit (CPU), and a graphics processing unit (GPU).

Figure 18:
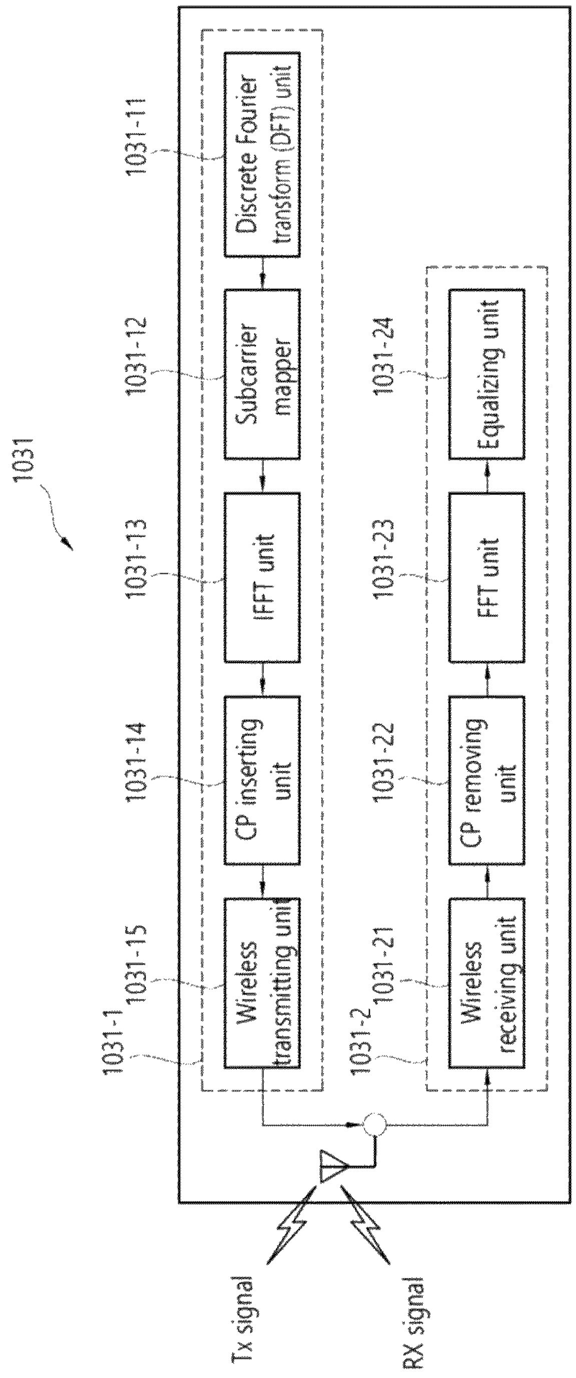
FIG. 18 is a detailed block diagram of a transceiver of a first apparatus shown in FIG. 15 or a transceiving unit of an apparatus shown in FIG. 16.

FIG. 18 is a detailed block diagram of a transceiver of a first apparatus shown in FIG. 15 or a transceiving unit of an apparatus shown in FIG. 16.

Referring to FIG. 18, the transceiving unit 1031 (e.g., transceiving circuit) includes a transmitter 1031-1 and a receiver 1031-2. The transmitter 1031-1 includes a discrete Fourier transform (DFT) unit 1031-11 (e.g., DFT circuit), a subcarrier mapper 1031-12 (e.g., subcarrier mapping circuit), an IFFT unit 1031-13 (e.g., IFFT circuit), a cyclic prefix (CP) insertion unit 1031-14 (e.g., CP insertion circuit), and a wireless transmitting unit 1031-15 (e.g., wireless transmitting circuit). The transmitter 1031-1 may further include a modulator. Further, the transmitter 1031-1 may for example include a scramble unit (e.g., scrambling circuit), a modulation mapper, a layer mapper, and a layer permutator, which may be disposed before the DFT unit 1031-11. That is, to prevent a peak-to-average power ratio (PAPR) from increasing, the transmitter 1031-1 subjects information to the DFT unit 1031-11 before mapping a signal to a subcarrier. The signal spread (or pre-coded) by the DFT unit 1031-11 is mapped onto a subcarrier by the subcarrier mapper 1031-12 and made into a signal on the time axis through the IFFT unit 1031-13. Some of constituent elements is referred to as a unit in the disclosure. However, the embodiments are not limited thereto. For example, such term "unit" is also referred to as a circuit block, a circuit, or a circuit module.

The DFT unit 1031-11 performs DFT on input symbols to output complex-valued symbols. For example, when Ntx symbols are input (here, Ntx is a natural number), DFT has a size of Ntx. The DFT unit 1031-11 may be referred to as a transform precoder. The subcarrier mapper 1031-12 maps the complex-valued symbols onto respective subcarriers in the frequency domain. The complex-valued symbols may be mapped onto resource elements corresponding to resource blocks allocated for data transmission. The subcarrier mapper 1031-12 may be referred to as a resource element mapper. The IFFT unit 1031-13 performs IFFT on the input symbols to output a baseband signal for data as a signal in the time domain. The CP inserting unit 1031-14 copies latter part of the baseband signal for data and inserts the latter part in front of the baseband signal for data. CP insertion prevents inter-symbol interference (ISI) and inter-carrier interference (ICI), thereby maintaining orthogonality even in a multipath channel.

On the other hand, the receiver 1031-2 includes a wireless receiving unit 1031-21 (e.g., wireless receiving circuit), a CP removing unit 1031-22 (e.g., CP removing circuit), an FFT unit 1031-23 (e.g., FFT circuit), and an equalizing unit 1031-24 (e.g., equalizing circuit). The wireless receiving unit 1031-21, the CP removing unit 1031-22, and the FFT unit 1031-23 of the receiver 1031-2 perform reverse functions of the wireless transmitting unit 1031-15, the CP inserting unit 1031-14, and the IFFT unit 1031-13 of the transmitter 1031-1. The receiver 1031-2 may further include a demodulator.

According to the embodiments of the present disclosure, channel state information (CSI) report configuration for network energy saving (NES) in a wireless communication system and a CSI obtaining procedure for a CSI report based on the CSI report configuration are efficiently performed.

Although the preferred embodiments of the disclosure have been illustratively described, the scope of the disclosure is not limited to only the specific embodiments, and the disclosure can be modified, changed, or improved in various forms within the spirit of the disclosure and within a category written in the claim.

In the above exemplary systems, although the methods have been described in the form of a series of steps or blocks, the disclosure is not limited to the sequence of the steps, and some of the steps may be performed in different order from other or may be performed simultaneously with other steps. Further, those skilled in the art will understand that the steps shown in the flowcharts are not exclusive and may include other steps or one or more steps of the flowcharts may be deleted without affecting the scope of the disclosure.

Claims of the present disclosure may be combined in various manners. For example, technical features of the method claim of the present disclosure may be combined to implement a device, and technical features of the device claim of the present disclosure may be combined to implement a method. In addition, the technical features of the method claim and the technical features of the device claim of the present disclosure may be combined to implement a device, and technical features of the method claim and the technical features of the device claim of the present disclosure may be combined to implement a method.

What is claimed is:

1. A method of operating a terminal in a wireless communication system, the method comprising:
- receiving a channel state information (CSI) report configuration information; and
- reporting one or more CSI,
- wherein the received CSI report configuration information comprises sub-configuration information, and
- wherein the one or more CSI is reported for one or more sub-configurations based on the received CSI report configuration information.

2. The method of claim 1, wherein the one or more CSI is generated based on channel measurements performed per sub-configuration.

3. The method of claim 1, wherein a downlink channel measurement process for obtaining the one or more CSI is allocated per sub-configuration.

4. The method of claim 1, wherein a maximum number of sub-configuration information is included in the CSI report configuration information, and the maximum number of sub-configuration information depends on capability of the terminal.

5. A method of operating a base station in a wireless communication system, the method comprising:
- transmitting channel state information (CSI) report configuration information; and
- receiving one or more CSI,
- wherein the transmitted CSI report configuration information comprises sub-configuration information, and
- wherein the one or more CSI is received for one or more sub-configurations based on the transmitted CSI report configuration information.

6. The method of claim 5, wherein the one or more CSI is generated based on channel measurements performed per sub-configuration.

7. The method of claim 5, wherein a downlink channel measurement process for obtaining the one or more CSI is allocated per sub-configuration.

8. The method of claim 5, wherein a maximum number of sub-configuration information is included in the CSI report configuration information, and the maximum number of sub-configuration information depends on capability of a terminal.

9. A communication device in a wireless communication system, comprising:
- at least one processor; and
- at least one memory configured to store instructions, and operably electrically connected to the at least one processor, wherein operations performed based on the instructions being executed by the at least one processor comprise:
- receiving a channel state information (CSI) report configuration information; and reporting one or more CSI, wherein the received CSI report configuration information comprises sub-configuration information, and wherein the one or more CSI is reported for one or more sub-configurations based on the received CSI report configuration information.

10. The communication device of claim 9, wherein the one or more CSI is generated based on channel measurements performed per sub-configuration.

11. The communication device of claim 9, wherein a downlink channel measurement process for obtaining the one or more CSI is allocated per sub-configuration.

12. The communication device of claim 9, wherein a maximum number of sub-configuration information is included in the CSI report configuration information, and the maximum number of sub-configuration information depends on capability of the communication device.

* * * * *